(12) United States Patent
Kenmochi et al.

(10) Patent No.: US 9,497,405 B2
(45) Date of Patent: Nov. 15, 2016

(54) DISPLAY DEVICE FOR DISPLAYING VIDEOS SIDE BY SIDE WITHOUT OVERLAPPING EACH OTHER AND METHOD FOR THE SAME

(71) Applicant: NEC Display Solutions, Ltd., Tokyo (JP)

(72) Inventors: Isamu Kenmochi, Tokyo (JP); Tomohisa Ukegawa, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 14/414,665

(22) PCT Filed: Jul. 16, 2013

(86) PCT No.: PCT/JP2013/069282
§ 371 (c)(1),
(2) Date: Jan. 13, 2015

(87) PCT Pub. No.: WO2014/013979
PCT Pub. Date: Jan. 23, 2014

(65) Prior Publication Data
US 2015/0124170 A1 May 7, 2015

(30) Foreign Application Priority Data

Jul. 17, 2012 (WO) .................. PCT/JP2012/068074
Dec. 27, 2012 (WO) .................. PCT/JP2012/083995

(51) Int. Cl.
*H04N 5/445* (2011.01)
*H04N 21/426* (2011.01)
(Continued)

(52) U.S. Cl.
CPC ........ *H04N 5/44591* (2013.01); *H04N 21/426* (2013.01); *H04N 21/4316* (2013.01); *H04N 7/0122* (2013.01)

(58) Field of Classification Search
CPC ..................... H04N 21/4316; H04N 21/4858; H04N 5/44591; H04N 5/2624; G09G 5/14
USPC ....................................................... 348/564
See application file for complete search history.

(56) References Cited

U.S. PATENT DOCUMENTS

| 5,754,242 A | * | 5/1998 | Ohkami | ................. H04N 19/85 345/629 |
| 7,119,851 B2 | * | 10/2006 | Ono | ........................ H04N 5/45 348/554 |

(Continued)

FOREIGN PATENT DOCUMENTS

| JP | 09-009230 A | 1/1997 |
| JP | 2000-041201 A | 2/2000 |

(Continued)

OTHER PUBLICATIONS

International Search Report (ISR) (PCT Form PCT/ISA/210), in PCT/JP2013/069282, dated Aug. 13, 2013.

(Continued)

*Primary Examiner* — Michael Lee
(74) *Attorney, Agent, or Firm* — McGinn IP Law Group, PLLC

(57) ABSTRACT

A display device includes a processing unit that determines whether a plurality of videos can be displayed side by side without overlapping each other in a display unit without changing resolutions of the plurality of videos. When the processing unit determines that the plurality of videos can be displayed, it causes the display unit to display the plurality of videos side by side without overlapping each other without changing the resolutions of the plurality of videos. When the processing unit determines that the plurality of videos cannot be displayed, it changes a resolution of at least one of the plurality of videos based on a resolution of the display unit, the resolutions of the plurality of videos, and a priority order, and causes the display unit to display the plurality of videos including the video for which the resolution has been changed side by side without overlapping each other.

18 Claims, 20 Drawing Sheets

(51) Int. Cl.
*H04N 21/431* (2011.01)
*H04N 7/01* (2006.01)

(56) References Cited

U.S. PATENT DOCUMENTS

| | | | | |
|---|---|---|---|---|
| 7,268,830 | B2* | 9/2007 | Lee | G06F 3/0481 |
| | | | | 348/565 |
| 7,292,284 | B2* | 11/2007 | Kim | H04N 5/44591 |
| | | | | 348/564 |
| 8,544,056 | B2* | 9/2013 | Ohno | H04N 5/45 |
| | | | | 348/564 |
| 8,823,716 | B2* | 9/2014 | Ueda | G09G 5/14 |
| | | | | 345/501 |
| 2005/0012863 | A1* | 1/2005 | Yui | G09G 5/14 |
| | | | | 348/592 |
| 2005/0157948 | A1* | 7/2005 | Lee | G06F 3/14 |
| | | | | 382/299 |
| 2008/0012989 | A1* | 1/2008 | Kim | H04N 5/44591 |
| | | | | 348/588 |
| 2008/0024666 | A1* | 1/2008 | Sudo | H04N 5/44543 |
| | | | | 348/565 |
| 2008/0115081 | A1* | 5/2008 | Sankaravadivelu | G06F 3/0481 |
| | | | | 715/783 |
| 2010/0110294 | A1* | 5/2010 | Oka | H04N 5/44591 |
| | | | | 348/564 |
| 2012/0086790 | A1* | 4/2012 | Takahira | A61B 1/00048 |
| | | | | 348/68 |

FOREIGN PATENT DOCUMENTS

| | | |
|---|---|---|
| JP | 2000-221952 A | 8/2000 |
| JP | 2001-346121 A | 12/2001 |
| JP | 2002-077767 A | 3/2002 |
| JP | 2004-334058 A | 11/2004 |
| JP | 2005-020743 A | 1/2005 |
| JP | 2008-079077 A | 4/2008 |
| JP | 2008-167265 A | 7/2008 |
| JP | 2009-303137 A | 12/2009 |
| JP | 2010-108372 A | 5/2010 |
| JP | 2011-139249 A | 7/2011 |

OTHER PUBLICATIONS

International Search Report (ISR) (PCT Form PCT/ISA/210), in PCT/JP2012/068074, dated Oct. 9, 2012.
International Search Report (ISR) (PCT Form PCT/ISA/210), in PCT/JP2012/083995, dated Apr. 9, 2013.
Japanese Notice of Allowance dated Sep. 13, 2016 in Japanese Application No. 2014-525821, with an English translation thereof.

* cited by examiner

DISPLAY DEVICE FOR DISPLAYING VIDEOS SIDE BY SIDE WITHOUT OVERLAPPING EACH OTHER AND METHOD FOR THE SAME

TECHNICAL FIELD

The present invention relates to a display device and a display method.

BACKGROUND ART

An example of a video display device that displays a plurality of videos on a single screen is disclosed in Patent Document 1. The video display device that is disclosed in Patent Document 1 switches automatically between displaying videos of two channels and displaying a video of one channel on one screen without inputting a switching signal from outside.

Here, the word "screen" shall be confirmed. For example, in Patent Document 1, the case of displaying videos of two channels on a single screen is called "two-screen" display, while the case of displaying a video of one channel in one screen is called "one-screen" display. That is, the word "screen" is used with the meaning of a display region corresponding to each video signal. On the other hand, "screen" is also used as a word meaning the entire surface that projects an image in a video display device. In this case, a screen would mean each display surface of a video display device. For example, "two screens" ordinarily means two display surfaces of two video display devices. In the present application, the word "screen" is used with the latter meaning, that is, as a word meaning the entire surface that projects an image in a video display device.

As disclosed in Patent Document 1, in the case of displaying the videos of two channels in a single screen, the modes of displaying videos of two channels can be classified into the following two types. The first is a mode that displays videos of two channels in an overlapping manner. The second is a mode that displays the videos of two channels side by side without overlapping. Here, referring to FIG. 21, a description shall be given for a display example of the latter display mode, that is, the mode of displaying the videos of two channels side by side on one screen. FIG. 21 is a diagram that describes a display example of the mode that displays the videos of two channels side by side on one screen.

In the example shown in FIG. 21, a partition line 920 is set in the middle of the screen of a video display device 902, and two videos by video signals of two channels are displayed separately on the left side and right side of the partition line 920. That is, based on a left-side video signal and a right-side video signal that are video signals of two channels, a video 921 by the left-side video signal is displayed on the left side of the partition line 920, and a video 922 by the right-side video signal is displayed on the right side of the partition line 920. In the example shown in FIG. 21, in the case of the original resolution of the left-side video signal being greater than half of the resolution of the screen of the video display device 902, the video 921 that is displayed on the left side of the partition line 920 becomes a reduced video. Also, in the example shown in FIG. 21, in the case of the original resolution of the right-side video signal being less than half of the resolution of the screen of the video display device 902, the video 922 that is displayed on the right side of the partition line 920 is a video of the same resolution as the original resolution. In the example shown in FIG. 21, the video 921 of the left side is shown having been reduced.

Note that the word "resolution" is used in the two senses of: the sense of fineness of the pixels (also called dots, pixels and the like); and the sense of total number of pixels. In the case of the former, resolution is expressed by dot pitch or dpi (dots per inch). In the case of the latter, resolution is a value that is expressed in the form of the product of the number of dots in the horizontal direction of the screen and the number of dots in the vertical direction, that is, "number of dots in horizontal direction"ד"number of dots in vertical direction". In the present application, the latter meaning, that is, expressing resolution as the total pixel number, is employed. In this case, resolution is also called screen resolution.

PRIOR ART DOCUMENTS

Patent Document

[Patent Document 1] Japanese Unexamined Patent Application, First Publication No. 2001-346121

SUMMARY OF THE INVENTION

Problem to be Solved by the Invention

However, in the related art mentioned above, in the case of displaying two screens side by side in the long direction, due to the display of the input images in a reduced manner, there have been problems of loss of the information amount of images, and deterioration of the image quality.

Also, in the related art mentioned above, when videos of two channels are displayed side by side in one screen, in the case of text being included in the video 921 of FIG. 21 for example, due to the reduction of the video 921, the text becomes difficult to view. That is, in the case of displaying a plurality of videos on one screen, depending on the display method, there has been the problem of the videos being difficult to view.

The present invention has been achieved in view of the above circumstances, and has as its exemplary object to provide a display device and a display method that can ensure the ease of viewing of videos when displaying a plurality of videos on one screen.

Means for Solving the Problem

In order to solve the aforementioned problems, a display device of one exemplary aspect of the present invention includes: a display unit that simultaneously displays a plurality of videos; a priority order setting unit that sets a priority order for the plurality of videos; and a processing unit that causes the display unit to display the plurality of videos, and the processing unit determines whether or not the plurality of videos can be displayed side by side without overlapping each other in the display unit without changing resolutions of the plurality of videos, when, as a result of the determination, the processing unit determines that the plurality of videos can be displayed side by side without overlapping each other in the display unit without changing the resolutions of the plurality of videos, the processing unit causes the display unit to display the plurality of videos side by side without overlapping each other without changing the resolutions of the plurality of videos, and when, as the result of the determination, the processing unit determines that the plurality of videos cannot be displayed side by side without overlapping each other in the display unit without changing the resolutions of the plurality of videos, the processing unit changes a resolution of at least one of the plurality of videos based on a resolution of the display unit, the resolutions of the plurality of videos, and the priority order, and causes the display unit to display the plurality of videos including the video for which the resolution has been changed side by side without overlapping each other.

In order to solve the aforementioned problems, a display method of one exemplary aspect of the present invention includes: a display step of simultaneously displaying a plurality of videos in a display unit; a priority order setting step of setting a priority order for the plurality of videos; a step of determining whether or not the plurality of videos can be displayed side by side without overlapping each other in the display unit without changing the resolutions of the plurality of videos; a step of, when, as a result of the determination, it is determined that the plurality of videos can be displayed side by side without overlapping each other in the display unit without changing the resolutions of the plurality of videos, causing the display unit to display the plurality of videos side by side without overlapping each other without changing the resolutions of the plurality of videos; and a step of, when, as the result of the determination, it is determined that the plurality of videos cannot be displayed side by side without overlapping each other in the display unit without changing the resolutions of the plurality of videos, changing a resolution of at least one of the plurality of videos based on a resolution of the display unit, the resolutions of the plurality of videos, and the priority order, and causing the display unit to display the plurality of videos including the video for which the resolution has been changed side by side without overlapping each other.

Effect of the Invention

According to the present invention, if a high priority order is set in advance for a video that is sought to be displayed without being reduced, it is possible to display the video in the display unit without being reduced. Therefore, in the case of displaying a plurality of videos on one screen, if a high priority order is set in advance for a video that includes text or the like, it is possible to further reduce the possibility of the text being difficult to view.

EMBODIMENTS FOR CARRYING OUT THE INVENTION

First Exemplary Embodiment

Figure 1:
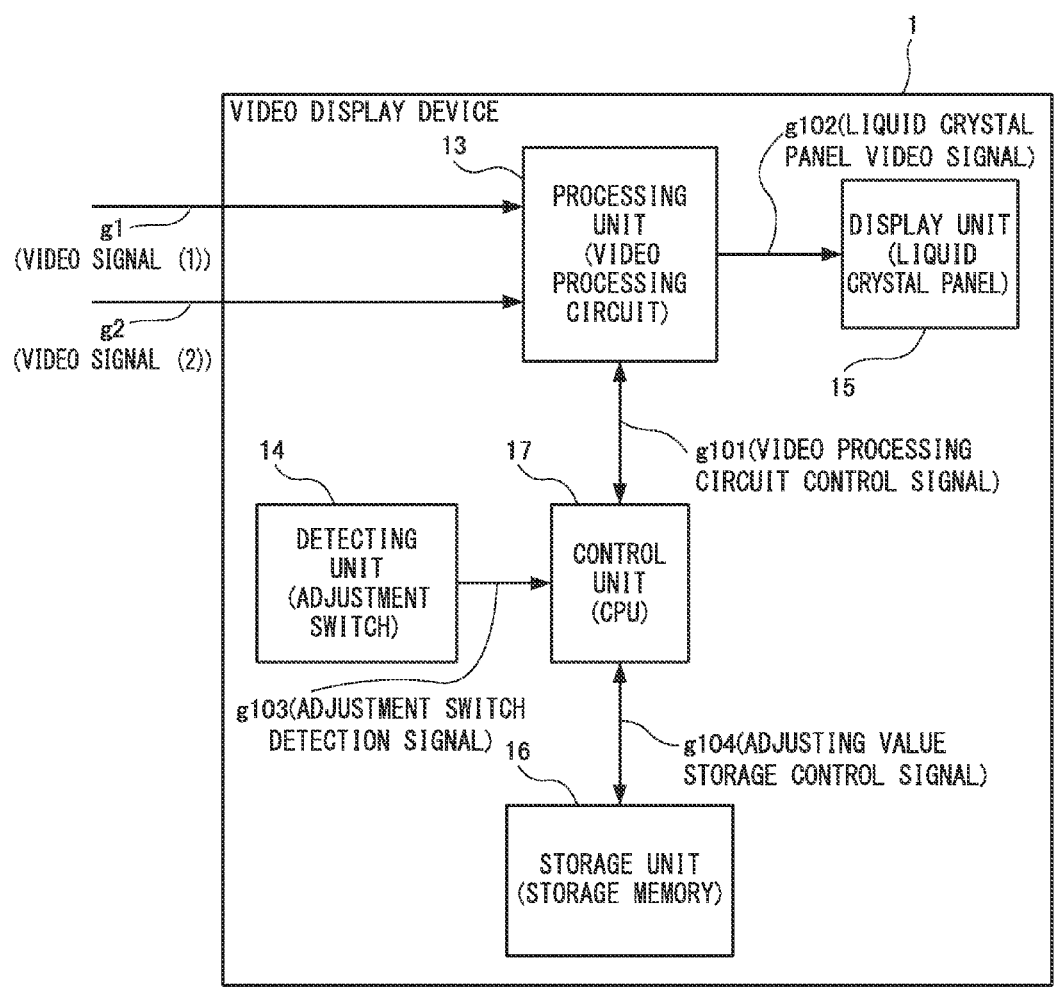
FIG. 1 is a block diagram that shows a configuration example of a display device according to a first exemplary embodiment.

Hereinbelow, exemplary embodiments of the present invention shall be described referring to the drawings. FIG. 1 is a block diagram that shows a configuration example of a display device 1 as the present exemplary embodiment. The display device 1 includes a processing unit (video processing circuit) 13, a detecting unit (adjustment switch) 14, a display unit (liquid crystal panel) 15, a storage unit (storage memory) 16, and a control unit (central processing unit (CPU)) 17.

Note that in the following description, the resolution of an image that is contained in a video signal is also called the resolution of the video signal, and information of the resolution is also called resolution information. An image that is contained in the video signal is called an image or video that is displayed in the display unit 15 by the video signal.

The processing unit (video processing circuit) 13 is a signal processing circuit that includes an MPU (Micro-Processing Unit), and receives from the outside a video signal (1) g1 and a video signal (2) g2 of two channels, receives and outputs a video processing circuit control signal g101 from/to the control unit (17), and outputs a liquid crystal panel video signal g102. The video signal (1) g1 and the video signal (2) g2 are video signals of predetermined formats, and are signals expressing moving images or still images. The video signal (1) g1 and the video signal (2) g2 for example include information or the like showing the resolution of the video that each signal shows. The video processing circuit control signal g101 is a signal expressing commands or data of a plurality of types, and is mutually inputted and outputted to/from the control unit (CPU) 17. The liquid crystal panel video signal g102 is a signal that represents the video that the display unit (liquid crystal panel) 15 displays.

The processing unit (video processing circuit) 13 performs video processing such as enlargement, reduction, display position adjustment, compositing and the like of videos that the video signal (1) g1 and the video signal (2) g2 represent, in accordance with the video processing circuit control circuit g101, generates the liquid crystal panel video signal g102, and outputs it to the display unit (liquid crystal panel) 15. Note that enlargement and reduction of a video are also called changes of the resolution of a video. Also, the processing unit (video processing circuit) 13, in accordance with the video processing circuit control signal g101, generates a signal representing a predetermined menu video, and performs video processing that combines it with the videos that the video signal (1) g1 and the video signal (2) g2 represent. Furthermore, the processing unit (video processing circuit) 13 detects the resolution (total pixel number) of the video signal (1) g1 that has been input and the resolution of the video signal (2) g2 that has been input, and outputs a signal that indicates the detected results to the control unit (CPU) 17 as one signal contained in the video processing circuit control signal g101.

The display unit (liquid crystal panel) 15 has a polarizing filter, a glass substrate, a liquid crystal, a back light, a substrate driving circuit, and the like, and displays video using a plurality of pixels arranged in a lattice shape. The output resolution of the display unit (liquid crystal panel) 15 is determined by the pixel number. Also, the video that the display unit (liquid crystal panel) 15 displays is determined based on the liquid crystal panel video signal g102. That is, the display unit (liquid crystal panel) 15 has a fixed output resolution, and displays a video based on the liquid crystal panel video signal g102. However, the display unit with which the display device 1 is equipped is not limited to a liquid crystal panel, and may have another structure, for example, an organic EL (electro-luminescence) panel.

While the control unit (CPU) 17 receives an adjustment switch detection signal g103 outputted from the detecting unit (adjustment switch) 14 and reads/writes an adjustment value storage control signal g104 in the storage unit (storage memory) 16, it receives and outputs the video processing circuit control signal g101 from/to the processing units (video processing circuit) 13. The control unit (CPU) 17, by transmitting the predetermined video processing circuit control signal g101 to the processing unit (video processing circuit) 13, causes the processing unit (video processing circuit) 13 to perform video processing such as enlargement, reduction, display position adjustment, compositing and the like of the videos represented by the video signal (1) g1 and the video signal (2) g2 as well as compositing a predetermined menu video. Also, the control unit (CPU) 17 receives from the detecting unit (adjustment switch) 14 the adjustment switch detection signal g103 which shows the content of the operation that the user performed on the detecting unit (adjustment switch) 14 in accordance with the menu video.

Based on the adjustment switch detection signal g103, the control unit (CPU) 17 generates the adjustment value storage control signal g104, and saves it in the storage unit (storage memory) 16. The control unit (CPU) 17, responding to operation of the detecting unit (adjustment switch) 14, generates and saves the adjustment value storage control signal g104, which shows for example which of the video signal (1) g1 and the video signal (2) g2 of the channels to preferentially display, that is, which priority order to raise. The control unit (CPU) 17 generates various video processing circuit control signals g101 based on the adjustment value storage control signal g104 saved in the storage unit (storage memory) 16, and outputs them to the processing unit (video processing circuit) 13.

In addition, the adjustment value storage control signal g104 can contain a plurality of data. That is, the adjustment value storage control signal g104 can contain the data that shows the priority order of the video signal (1) g1 or the video signal (2) g2, as mentioned above. In addition, the adjustment value storage control signal g104 can contain data that shows the way of arranging the two video signals (for example, whether to display them arranged left and right without overlapping, whether to display them arranged top and bottom without overlapping, as well as which to display on the left (or the right), and which to display on the top (or the bottom). Furthermore, the adjustment value storage control signal g104 can contain data for instructing whether or not to display the two video signals simultaneously, as well as data that shows the value of the spacing between the videos in the case of displaying the videos by the two video signals side by side without overlapping.

The detecting unit (adjustment switch) 14 is constituted by having pushbutton switches or cursor keys, whereby it detects the input operation of a user, and outputs the detected result as the adjustment switch detection signal g103. However, the detecting unit (adjustment switch) 14 is not limited to hard switches or hard keys, and may also be constituted with soft switches or soft keys using touch sensors or the like formed on the display unit (liquid crystal panel) 15. Moreover, the detecting unit (adjustment switch) 14 may be capable of receiving a user's input operation using a wireless signal such as an infrared signal, and receiving a user's input operation via a communication line from an external portable terminal device or the like.

The storage unit (storage memory) 16 is a non-volatile memory such as EEPROM (Electrically Erasable and Programmable Read-only Memory). The storage unit (storage memory) 16, in response to control by the control unit (CPU) 17, performs writing and reading of adjustment value storage control signals. Also, other data such as data that shows the output resolution of the display unit (liquid crystal panel) 15 is stored in the storage unit (storage memory) 16.

Figure 2:
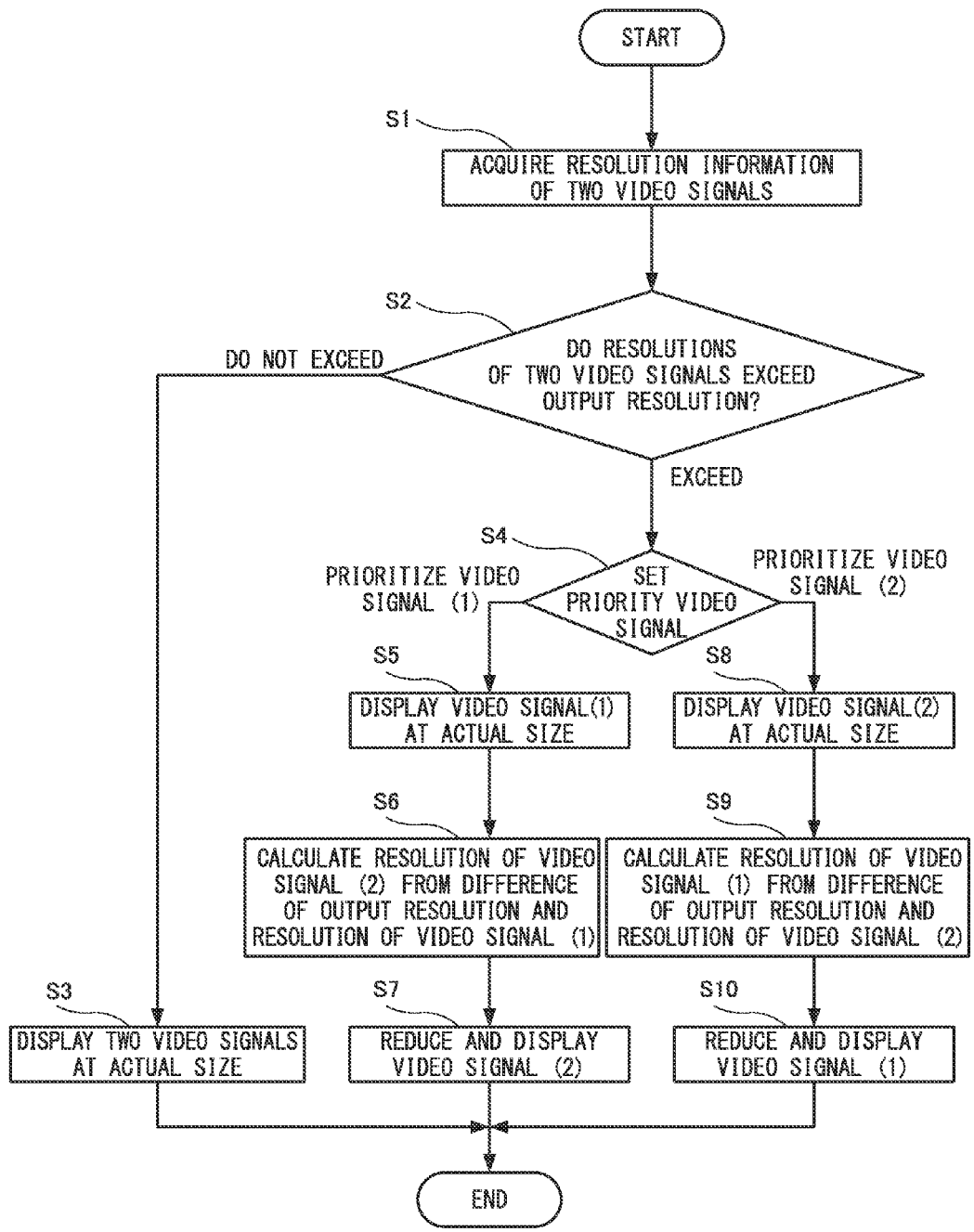
FIG. 2 is a flowchart that shows an operation example of a video display device shown in FIG. 1 according to the first exemplary embodiment.

Next, an operation example of the display device 1 shown in FIG. 1 shall be described, with reference to FIG. 2. FIG. 2 is a flowchart that shows an operation example of the video display device shown in FIG. 1 according to the present exemplary embodiment. The flowchart shown in FIG. 2 shows the flow of processing when, in the case of video signals (1) g1 and (2) g2 of two channels being input to the display device 1, the video that the video signal (1) g1 represents and the video that the video signal (2) g2 represents are to be displayed simultaneously in the display unit (liquid crystal panel) 15. In this case, the two videos are displayed side by side on the left and right (or top and bottom) without overlapping in the display unit (liquid crystal panel) 15.

Figure 3:
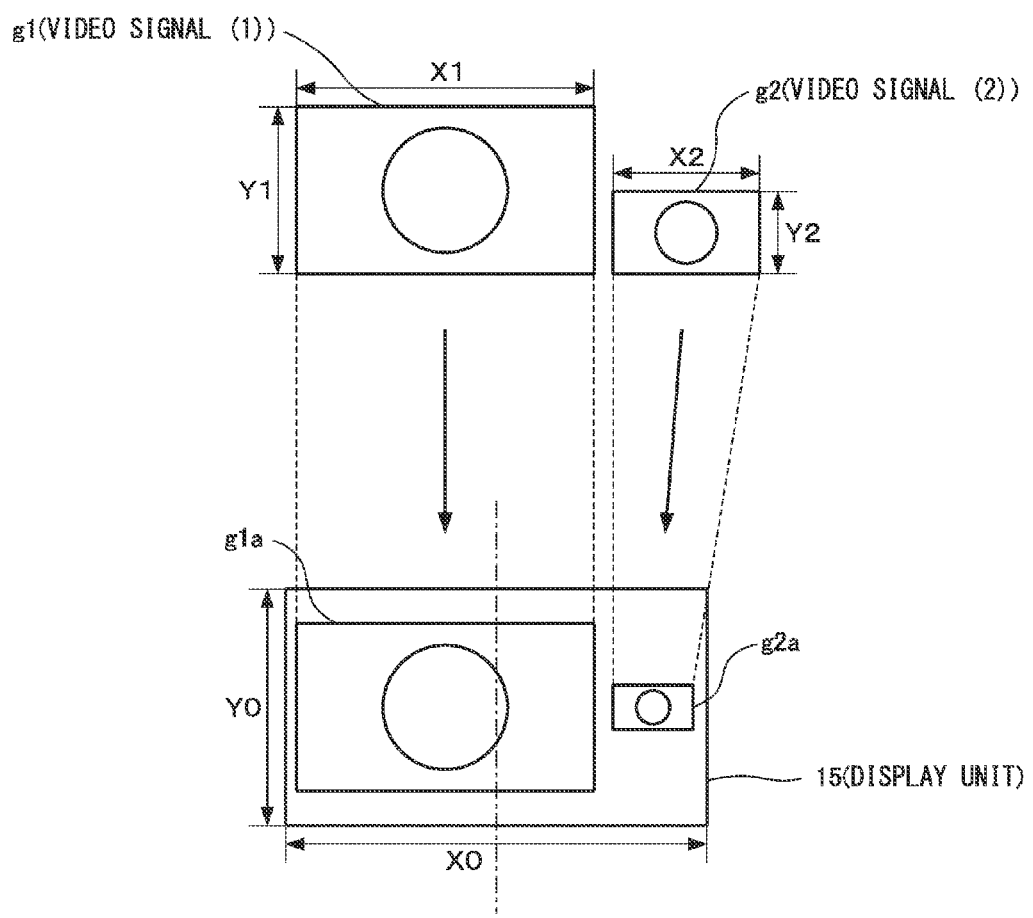
FIG. 3 is an explanatory diagram for explaining a display example of the video display device shown in FIG. 1 according to the first exemplary embodiment.

Also, the resolution of video signal (1) g1 and the resolution of video signal (2) g2 both are assumed to be values smaller than the output resolution of the display unit (liquid crystal panel) 15. That is to say, as shown for example in FIG. 3, assuming the output resolution of the display unit (liquid crystal panel) 15 to be X0×Y0, the resolution of video signal (1) g1 to be X1×Y1, and the resolution of video signal (2) g2 to be X2×Y2, the relations of X1<X0, X2<X0, Y1<Y0, and Y2<Y0 hold. Note that FIG. 3 is an explanatory diagram for describing the display example of the display device 1 shown in FIG. 1 according to the present exemplary embodiment. Here, X0, X1 and X2 are pixel numbers in the horizontal direction. Y0, Y1 and Y2 are pixels numbers in the vertical direction.

Also, the process shown in FIG. 2 is started in the case of a setting that relates to the priority order of the video signal (1) g1 or the video signal (2) g2 and a setting that instructs performance of an operation to simultaneously display two videos based on the video signals of two channels side by side on the left and right (or top and bottom) without overlapping being performed, in response to an operation by the user on the detecting unit (adjustment switch) 14. In this case, in advance of the processing of FIG. 2, the control unit (CPU 17) generates the adjustment value storage control signal g104 which contains data indicating which of the video signal (1) g1 and the video signal (2) g2 is to be displayed preferentially, data that indicates performing an operation to display the videos side by side on the left and right or top and bottom based on the video signal (1) g1 and the video signal (2) g2, and data that indicates which is to be displayed on the left (or right) or the top (or bottom), and saves it in the storage unit (storage memory) 16.

When the process begins, first, the processing unit (video processing circuit) 13 acquires information of the resolution from the video signal (1) g1 and the video signal (2) g2 that have been input (Step S1). Next, the control unit (CPU) 17 receives from the processing unit (video processing circuit) 13 information of each resolution acquired in Step S1, and determines whether or not the resolutions of the two video signals exceed the output resolution of the display unit (liquid crystal panel) 15 that outputs each video signal (Step S2).

In Step S2, the control unit (CPU) 17, in the case of arranging two videos side by side on the left and right, determines that the resolutions of the two video signals do not exceed the resolution of the output resolution when, in the example shown in FIG. 3, X1+X2≤X0. Also, when arranging the two videos side by side on the top and bottom, the control unit (CPU) 17 determines that the resolutions of the two video signals do not exceed the resolution of the output resolution when Y1+Y2≤Y0. That is, in Step S2, the control unit (CPU) determines whether or not the video by the video signal (1) g1 and the video by video signal (2) g2 can be displayed as is side by side in the display unit (liquid crystal panel) 15 without reduction on the left and right (or top and bottom) without overlapping.

In Step S2, in the case of the resolutions of the two video signals being determined as not exceeding the resolution of the output of the display unit (liquid crystal panel) 15, the control unit (CPU) 17 controls the processing unit (video processing circuit) 13 by outputting the predetermined video processing circuit control signal g101, and displays at actual size the two videos of the video by the video signal (1) g1 and the video by video signal (2) g2 side by side on the left and right (or top and bottom) without overlapping by the display unit (liquid crystal panel) 15 (Step S3). That is, in Step S3, the control unit (CPU) 17, without changing the resolution of the video by the video signal (1) g1 and the resolution of the video by video signal (2) g2, sets the processing unit (video processing circuit) 13 so as to display them side by side as is on the left and right (or top and bottom) without overlapping.

On the other hand, in Step S2, in the case of the resolutions of the two video signals being determined as exceeding the resolution of the output of the display unit (liquid crystal panel) 15, the control unit (CPU) 17 reads out the predetermined adjustment value storage control signal g104 from the storage unit (storage memory) 16, and determines which of the video signal (1) g1 and the video signal (2) g2 is set to a higher priority (Step S4).

In Step S4, in the case of the video signal (1) g1 being determined as having priority, the control unit (CPU) 17 controls the processing unit (video processing circuit) 13 by outputting the predetermined video processing circuit control signal g101 to display the video by the video signal (1) g1 at a predetermined position at actual size in the display unit (liquid crystal panel) 15 (Step S5). That is, the control unit (CPU) 17 displays the video signal (1) g1 at its actual size without changing its resolution (that is to say, without reducing it). Next, the control unit (CPU) 17 computes the resolution of the video signal (2) g2 from the difference between the output resolution of the display unit (liquid crystal panel) 15 and the resolution of video signal (1) g1 (Step S6).

In Step S6, in the case of two videos being arranged side by side on the left and right as shown in FIG. 3, the control unit (CPU) 17, based on the difference equaling X0–X1, makes a predetermined value not exceeding this difference of X0–X1 the resolution in the horizontal direction of the video signal (2) g2 after the change. Also, it computes the resolution in the vertical direction of the video signal (2) g2 after the change so that the aspect ratio is the same as the original video, based on the resolution in the horizontal direction after the change. On the other hand, in the case of arranging the two videos side by side on the top and bottom, the control unit (CPU) 17, based on the difference equaling Y0–Y1, makes a predetermined value not exceeding this difference of Y0–Y1 the resolution in the vertical direction of the video signal (2) g2 after the change. Also, it computes the resolution in the horizontal direction of the video signal (2) g2 after the change so that the aspect ratio is the same as the original video, based on the resolution in the vertical direction after the change.

Next, the control unit (CPU) 17 controls the video processing circuit 101 by outputting the predetermined video processing circuit control signal g101, to reduce and display in the display unit (liquid crystal panel) 15 at a predetermined position the video by the video signal (2) g2 using the resolutions calculated in Step S6 (Step S7).

On the other hand, in the case of the video signal (2) g2 being judged as having priority, the control unit (CPU) 17 controls the processing unit (video processing circuit) 13 by outputting the predetermined video processing circuit control signal g101 to display the video by the video signal (2) g2 at a predetermined position at actual size in the display unit (liquid crystal panel) 15 (Step S8). That is, the control unit (CPU) 17 displays the video signal (2) g2 at its actual size without changing its resolution (that is to say, without reducing it). Next, the control unit (CPU) 17 computes the resolution of video signal (1) g1 from the difference between the output resolution of the display unit (liquid crystal panel) 15 and the resolution of the video signal (2) g2 (Step S9).

In Step S9, in the case of two videos being arranged side by side on the left and right as shown in FIG. 3, the control unit (CPU) 17, based on the difference equaling X0–X2, makes a predetermined value not exceeding this difference of X0–X2 the resolution in the horizontal direction of the video signal (1) g1 after the change. Also, it computes the resolution in the vertical direction of the video signal (1) g1 after the change so that the aspect ratio is the same as the original video, based on the resolution in the horizontal direction after the change. On the other hand, in the case of arranging the two videos side by side on the top and bottom, the control unit (CPU) 17, based on the difference equaling Y0–Y2, makes a predetermined value not exceeding this difference of Y0–Y2 the resolution in the vertical direction of the video signal (1) g1 after the change. Also, it computes the resolution in the horizontal direction of the video signal (1) g1 after the change so that the aspect ratio is the same as the original video, based on the resolution in the vertical direction after the change.

Next, the control unit (CPU) 17 controls the processing unit (video processing circuit) 13 by outputting the predetermined video processing circuit control signal g101, to reduce and display in the display unit (liquid crystal panel) 15 at a predetermined position the video by the video signal (1) g1 using the resolutions calculated in Step S9 (Step S10).

FIG. 3 shows a display example in the case of settings being performed for the priority order of the video signal (1) g1 to be the highest, and for the video signal (1) g1 and the video signal (2) g2 to be arranged side by side on the left and right without overlapping. Also, the resolution of the video signal (1) g1 is greater than the resolution of the video signal (2) g2. Moreover, the total of the resolution X1 in the horizontal direction of the video signal (1) g1 and the resolution X2 in the horizontal direction of the video signal (2) g2 exceeds the resolution X0 in the horizontal direction of the display unit (liquid crystal panel) 15. In this case, the judgment in Step S2 of FIG. 2 is "exceeds" and the judgment in Step S4 is "video signal (1) has priority". Thereby, the processing from Step S5 to Step S7 is performed. Accordingly, as shown in FIG. 3, the video g1a by the video signal (1) g1 is displayed at actual size on for example the left side of the screen of the display unit (liquid crystal panel) 15. Moreover, the video g2a by the video signal (2) g2 is displayed in a reduced state on for example the right side of the screen of the display unit (liquid crystal panel) 15.

Figure 4:
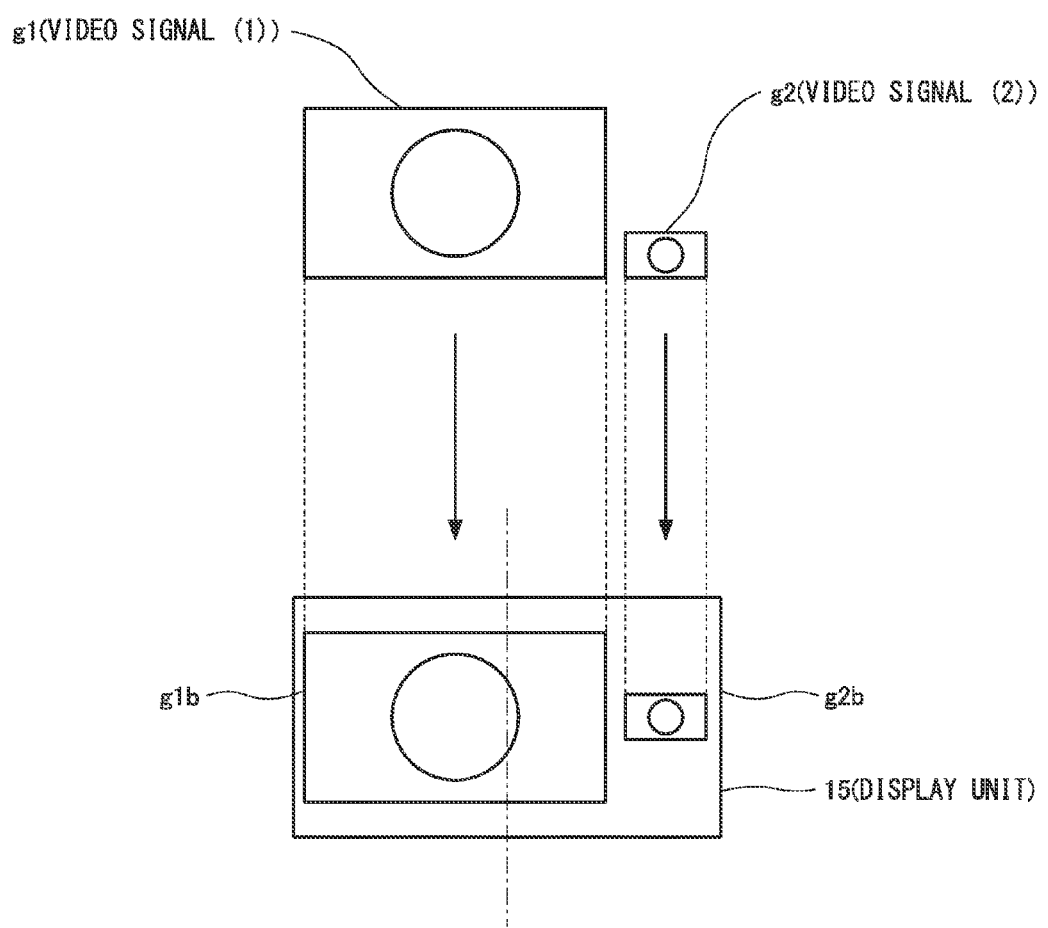
FIG. 4 is an explanatory diagram for explaining another display example of the video display device shown in FIG. 1 according to the first exemplary embodiment.

Next, referring to FIG. 4, another display example of the display device 1 shall be described. FIG. 4 is an explanatory diagram for explaining another display example of the display device 1 shown in FIG. 1 according to the first exemplary embodiment. FIG. 4 shows a display example in the case of settings being performed for the priority of the video signal (2) g2 to be the highest, and for the video signal (1) g1 and the video signal (2) g2 to be displayed side by side on the left and right without overlapping. Also, the resolution of the video signal (1) g1 is greater than the resolution of the video signal (2) g2. Moreover, the total of the resolution in the horizontal direction of the video signal (1) g1 and the resolution in the horizontal direction of the video signal (2) g2 does not exceed the resolution in the horizontal direction of the display unit (liquid crystal panel) 15. In this case, the judgment in Step S2 of FIG. 2 is "does not exceed". Thereby, the processing of Step S3 is performed. Accordingly, as shown in FIG. 4, the video g1b by the video signal (1) g1 is displayed at actual size on for example the left side of the screen of the display unit (liquid crystal panel) 15. Moreover, the video g2b by the video signal (2) g2 is displayed at actual size on for example the right side of the screen of the display unit (liquid crystal panel) 15.

In the examples shown in FIG. 3 and FIG. 4, by displaying the video with the highest priority in a non-reduced state, in the case of for example text being contained in that video, it is possible to perform easily viewable character display. Note that the video with the highest priority is also called the highest priority video.

In the above manner, the display device includes a display unit that displays videos, a priority order setting unit that sets a priority order with respect to a plurality of videos that are input, and a control unit that performs control so as to cause, among the plurality of video signals, the video signal for which the highest priority order set by the priority order setting unit to be displayed in a non-reduced state in the display unit and to cause the other video signal to be reduced and displayed in the display unit.

With this constitution, in the present exemplary embodiment, in the operation that displays without overlapping two input video signals in one screen of the display device 1 by the processing shown in FIG. 2, a priority order is set for the input video signals. Also, the input video signal with the higher priority order is displayed as is without being reduced, while the input video signal with the lower priority order is displayed reduced at a predetermined resolution in the remaining region on the screen. According to this constitution, even in the case of the resolutions of the two input video signals exceeding the resolution of the screen, it is possible to display at actual size one of the video signals. For this reason, by raising the priority order of a video signal in which for example text is sought to be displayed in an easily viewable manner, it is possible to perform easily viewable text display in the case of text being contained in the video.

Note that the exemplary embodiment of the present invention is not limited to the aforementioned one. For example, the input of a plurality of three or more of video signals may be enabled. In this case, a priority order is attached to each video signal, and it is possible to display at actual size the video by the video signal with the highest priority order. Also, the priority order with respect to a video signal is not limited to being set manually by the user, and for example may be automatically changed in a predetermined cycle. Also, with respect to the constitution shown in FIG. 1, it is possible to make suitable changes such as combining a plurality of blocks or further dividing blocks. For example, it is possible to combine the processing unit (video processing circuit) 13 and the control unit (CPU) 17, and constitute some of the functions that the processing unit (video processing circuit) 13 or the control unit (CPU) 17 has by blocks separate from the processing unit (video processing circuit) 13 and the control unit (CPU) 17.

Second Exemplary Embodiment

Figure 5:
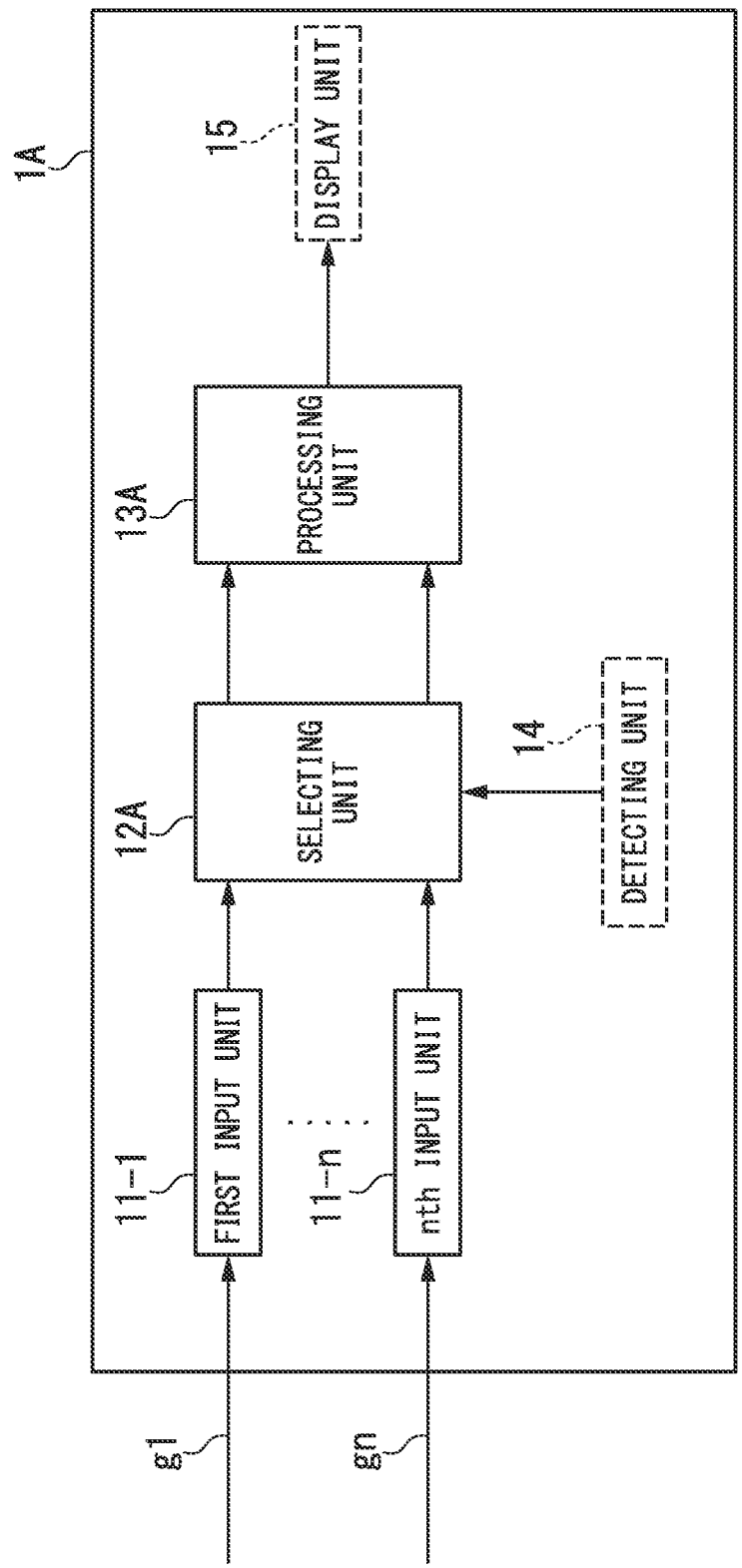
FIG. 5 is a block diagram of a schematic constitution of a display device according to a second exemplary embodiment.

FIG. 5 is a block diagram that shows a schematic configuration of a display device 1A according to the present exemplary embodiment. The display device 1A as shown in FIG. 5 includes a first input unit 11-1 to nth input unit 11-*n* of n number (n being an integer of 2 or more), a selecting unit 12A, and a processing unit 13A. The detecting unit 14 is connected to the selecting unit 12A. The display unit 15 is connected to the processing unit 13A.

The first input unit 11-1 outputs to the selecting unit 12A a first video signal g1 that has been input. The nth input unit 11-*n* outputs to the selecting unit 12A an nth video signal gn that has been input. The first input unit 11-1 to nth input unit 11-*n* include for example a video input terminal. Also, the first input unit 11-1 to nth input unit 11-*n*, in the case of the input video signal being an analog signal, may convert the analog signal to a digital signal, and output the converted video signal to the selecting unit 12A.

The selecting unit 12A selects at least one input unit from among the first input unit 11-1 to nth input unit 11-*n* based on a detection signal that the detecting unit 14 has detected. The detecting unit 14 detects a user's selection of a desired input unit and designation of a priority input unit via OSD (on-screen display) or the like by operation of a button switch or a remote control of the display device body. The selecting unit 12A outputs the video signal of the selected input unit to the processing unit 13A when one input unit is selected. The processing unit 13A processes the video signal appropriately as needed, and outputs it to the display unit 15. When two input units have been selected, the selecting unit 12A, based on the detection result of the detecting unit 14, prioritizes the video signal that has been input to the priority input unit designated by the user, and generates modification information that indicates changing the resolution of the image contained in the video signal input to the other input unit. The selecting unit 12A outputs the modification information that has been generated and the video signals g1 to gn that have been input to the processing unit 13A.

The processing unit 13A, based on the modification information input from the selecting unit 12A, does not change the resolution of the first image contained in the video signal input to the priority input unit, among the video signals g1 to gn. The processing unit 13A displays the first image at a predetermined position on the display unit 15. A predetermined position, in the case of the display unit having a horizontally long shape, here refers to a position that brings the left side of the first image to the left side of the display unit 15, or a position that brings the right side of the first image to the right side of the display unit 15. Alternatively, a predetermined position, in the case of the display unit having a vertically long shape, here refers to a position that brings the top side of the first image to the top side of the display unit 15, or a position that brings the bottom side of the first image to the bottom side of the display unit 15.

Also, the processing unit 13A, based on the modification information input from the selecting unit 12A, changes the resolution of the second image contained in the video signal input to other than the priority input unit, and displays the changed image in the remaining region of the display unit 15. Here, change of the resolution of an image refers to for example enlarging the image, reducing the image, or extracting a portion of the image.

As an example, the case of two video signals g1 and g2 being input shall be described.

Figure 6:
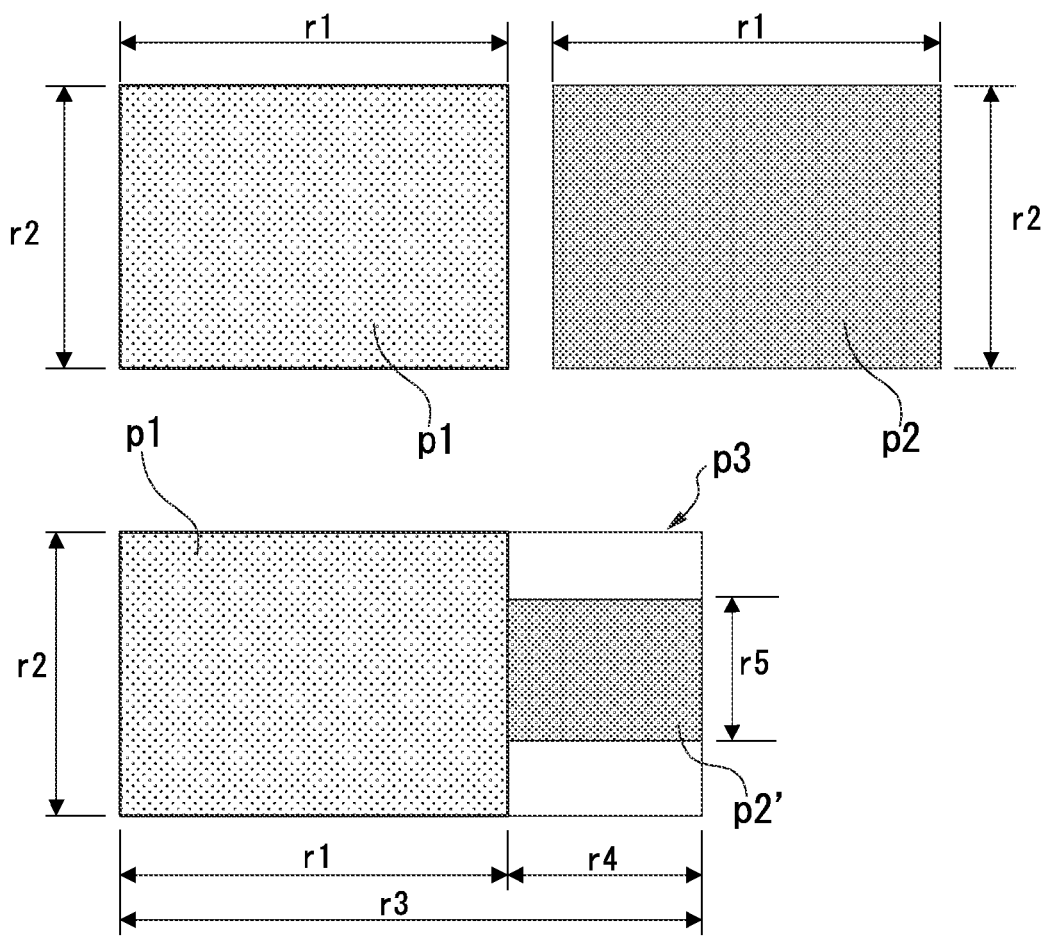
FIG. 6 is a diagram that explains an example of input images p1 and p2 and an display image p3 according to the second exemplary embodiment.

FIG. 6 is a diagram explaining an example of the input images p1 and p2 and the display image p3 according to the present exemplary embodiment. Here, the input images are the image contained in the video signal g1 input to the first input unit 11-1, and the image contained in the video signal g2 input to the second input unit 11-2. The display image is the image contained in the video signal output from the processing unit 13A. The example shown in FIG. 6 is the case of the first input unit 11-1 being designated as the priority input unit. Also, the input image p1 is displayed at a position on the left side of the display image p3 in the display unit 15, and the input image p2 is displayed at a position on the right side of the display image p3 in the display unit 15.

The input images p1 and p2 shown in the upper part of FIG. 6 have r1 pixels in the horizontal direction and r2 pixels in the vertical direction. The display image p3 shown in the lower part of FIG. 6 has r3 pixels in the horizontal direction and r2 pixels in the vertical direction. The display image p3 contains the input image p1 and the image p2', which is the input image p2 with its resolution changed.

Next, an example of the processing that the display device 1 performs when the video signal g1 that contains the input image p1 and the video signal g2 that contains the input image p2 are input shall be described.

First, based on the detection value that the detecting unit 14 has detected, the selecting unit 12A makes the first input unit 11-1 the priority input unit. Next, the selecting unit 12A generates modification information that indicates changing the resolution of the input image p2 without changing the resolution of the input image p1. Next, the selecting unit 12A outputs the generated modification information, and the video signals g1 and g2 that have been input to the processing unit 13A.

The processing unit 13A, based on the modification information input from the selecting unit 12A, displays the input image p1 at a position on the left side on the display unit 15 as shown in the lower part of FIG. 6 without changing the resolution of the input image p1. Next, based on the modification information input from the selecting unit 12A, the processing unit 13A changes the resolution of the input image p2, and displays it side by side in the remaining region on the display unit 15 so as not to overlap as shown in the lower part of FIG. 6. In the example shown in the lower part of FIG. 6, the processing unit 13A reduces the horizontal direction of the input image p2 from r1 pixels to r4 pixels, and reduces the vertical direction from r2 pixels to r5 pixels. Note that r4 is a value smaller than r1, and r5 is a value smaller than r2.

Note that in FIG. 6, it is possible to change the priority input unit with an instruction from the detecting unit 14 by a user operation. In the state shown in FIG. 6, the first input unit 11-1 is designated as the priority input unit, but it is possible to switch the priority input unit to the second input unit 11-2 by the desire of the user. In this case, the signal that is input to the priority input unit becomes the video signal g2, and the input image p2 is displayed on the right side of the display unit without changing its resolution, while the input image p1 based on the video signal g1 from the other input unit is displayed on the left side with its resolution reduced.

In the above manner, the display according to the present exemplary embodiment includes a plurality of input units to which video signals are respectively input, a selecting unit, and a processing unit, with the selecting unit selecting a plurality of input units among the plurality of input units, and making one input unit among the selected plurality of input units a priority input unit, the processing unit displaying on the display unit a first image contained in the video signal input to the priority input unit without changing its resolution, changing the resolution of a second image contained in the video signal input to the other input unit selected by the selecting unit, and displaying the image after the change in the region remaining on the display unit after displaying the first image.

Thereby, the display device 1A according to the present exemplary embodiment prioritizes the video signal input to the one input unit designated as the priority input unit, among the input units selected among the plurality first input unit 11-1 to nth input unit 11-*n*. The display device 1A according to the present exemplary embodiment displays on the display unit 15 the image contained in the image signal input to the priority input unit without changing its resolution. Moreover, the display device 1A according to the present exemplary embodiment changes the image contained in the video signal input to the other input unit and displays it in the remaining display region of the display unit 15. In this way, the display device 1A according to the present exemplary embodiment changes the image based on the image signal input to the other input unit without changing the resolution of the image contained in the video signal input to the priority input unit.

As a result, the display device 1A according to the present exemplary embodiment can display a plurality of images side by side without overlapping and in a manner reducing loss of the information amount of the images in the display region.

Note that in the example shown in FIG. 6, the example is described of reducing the input image p2 and displaying it in the display image p3, but it is not limited thereto. In the case of r1 pixels in the horizontal direction of the input image p2 being fewer than the r4 pixels in the horizontal direction of the remaining region, the processing unit 13A may enlarge the input image p2 and display the image after being enlarged in the remaining region.

Third Exemplary Embodiment

Figure 7:
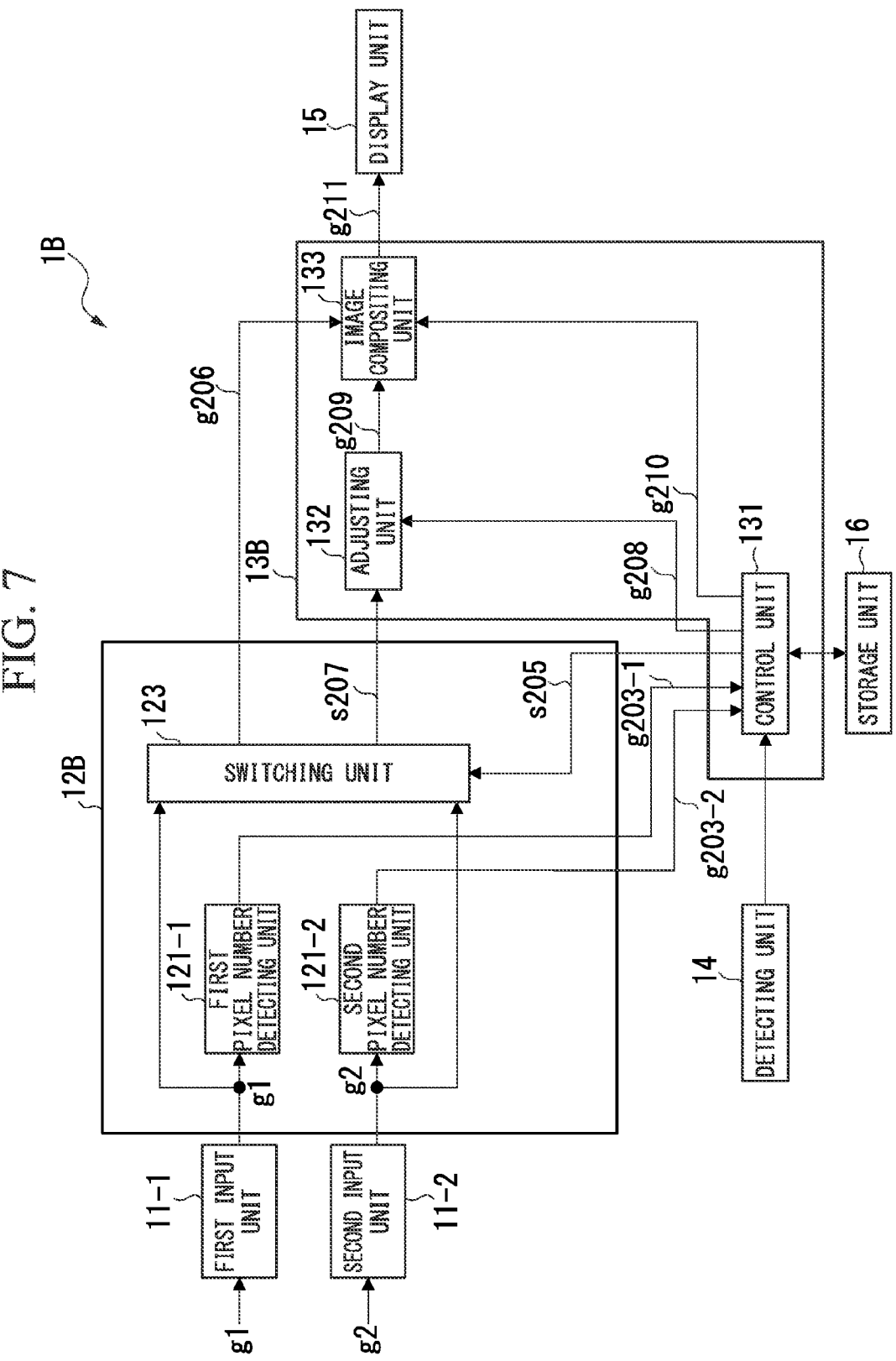
FIG. 7 is a block diagram of the schematic constitution of a display device according to a third exemplary embodiment.

FIG. 7 is a block diagram of a schematic configuration of a display device 1B according to the present exemplary embodiment. As shown in FIG. 7, the display device 1B includes the first input unit 11-1, the second input unit 11-2, a selecting unit 12B, a processing unit 13B, the detecting unit 14, the display unit 15, and the storage unit 16. Also, the selecting unit 12B includes a first pixel number detecting unit 121-1, a second pixel number detecting unit 121-2, and a switching unit 123. The processing unit 13B includes a control unit 131, an adjusting unit 132, and an image compositing unit 133. The function units having the same function as those in the second exemplary embodiment shall use the same reference symbols, with descriptions thereof being omitted.

First, the selecting unit 12B shall be described.

The first pixel number detecting unit 121-1 detects the pixel number of the image contained in the first video signal g1 input from the first input unit 11-1, and outputs information showing the detected pixel number to the control unit 131 of the processing unit 13B as video information g203-1.

The second pixel number detecting unit 121-2 detects the pixel number of the image contained in the second video signal g2 input from the second input unit 11-2, and outputs information showing the detected pixel number to the control unit 131 as video information g203-2.

The first video signal g1 that the first input unit 11-1 has output, the second video signal g2 that the second input unit 11-2 has output, and a selection signal g205 that the control unit 131 has output are input to the switching unit 123. Here, the selection signal g205 is a signal based on the priority assigned to the first input unit 11-1 or the second input unit 11-2 that have been input, based on an operation of the user detected by the detecting unit 14.

The switching unit 123, in accordance with the selection signal g205, selects the first input unit 11-1 or the second input unit 11-2. The switching unit 123 outputs the video signal that has been input to the selected input unit (called video signal g206) to the image compositing unit 133 of the processing unit 13B. The switching unit 123, in accordance with the selection signal g205, outputs the video signal that has been input to the input unit not selected (video signal g207) to the adjusting unit 132 of the processing unit 13B.

Next, the processing unit 13B shall be described.

The control unit 131 generates the selection signal g205 in accordance with an operation of the user detected by the detecting unit 14, and outputs the generated selection signal g205 to the switching unit 123.

Upon detecting that the user has selected prioritizing the first input unit 11-1, the control unit 131 generates the selection signal g205 that indicates outputting the first video signal g1 that has been input to the first input unit 11-1 to the image compositing unit 133, and outputting the second video signal g2 that has been input to the other second input unit 11-2 to the adjusting unit 132. Alternatively, upon detecting that the user has selected prioritizing the second input unit 11-2, the control unit 131 generates the selection signal g205 that indicates outputting the second video signal g2 that has been input to the second input unit 11-2 to the image compositing unit 133, and outputting the first video signal g1 that has been input to the other first input unit 11-1 to the adjusting unit 132.

The control unit 131, based on the video information g203-1 and the video information g203-2 input from the selecting unit 12B and the operation of the user detected by the detecting unit 14, generates modification information g208 for a video signal, and outputs the modification information g208 that has been generated to the adjusting unit 132. Here, the modification information g208 is information that indicates the reduction factor for reducing the resolution of the image contained in the video signal g207 input to the adjusting unit 132, or information that indicates the enlargement factor for enlarging it.

The control unit 131, based on the video information g203-1 and the video information g203-2 input from the selecting unit 12B and the operation of the user detected by the detecting unit 14, generates arrangement information g210 for each image contained in the first video signal g1 and the second video signal g2. The control unit 131 outputs the generated arrangement information g210 to the image compositing unit 133.

The control unit 131 stores the video information g203-1, the video information g203-2, the modification information g208, and the arrangement information g210 in the storage unit 16.

The video information g203-1, the video information g203-2, the modification information g208, and the arrangement information g210 are stored in the storage unit 16.

The adjusting unit 132, based on the modification information 208 input from the control unit 131, changes the resolution of the image contained in the video signal g207 input from the selecting unit 12B, and outputs a video signal g209 that includes the image whose resolution has been changed to the image compositing unit 133.

The image compositing unit 133 composites the image contained in the video signal g206 input from the selecting unit 12B and the image contained in the video signal g209 input from the adjusting unit 132 in accordance with the arrangement information g210 input from the control unit 131. The image compositing unit 133 displays the composited image in the display unit 15.

As an example, the case of two video signals g1 and g2 being input shall be described below with reference to FIG. 6 and FIG. 9.

In the example shown in FIG. 6, the resolutions of the input images p1 and p2 are equivalent. The resolutions of the input images p1 and p2 (r1 pixels in the horizontal direction×r2 pixels in the vertical direction) are for example 1920 pixels×1080 pixels. The resolution of the display image p3 displayed in the display unit 15 (r3 pixels in the horizontal direction×r2 pixels in the vertical direction) is for example 2560 pixels×1080 pixels.

In the example shown in FIG. 6, priority is given to the input image p1 contained in the video signal g1 that is input to the first input unit 11-1. For this reason, the processing unit 13B displays on the display unit 15 the input image p1 arranged at a position on the left side of the image p3 without changing its resolution (1920 pixels×1080 pixels). In the image p3, the r4 pixels in the horizontal direction of the remaining region after displaying the input image p1 is 640 pixels. For this reason, the processing unit 13A reduces the resolution of the input image p2 to for example 640 pixels× 360 pixels (r4 pixels in the horizontal direction×r5 pixels in the vertical direction). The processing unit 13B displays on the display unit 15 the reduced image p2' arranged in the remaining region of the image p3.

Figure 8:
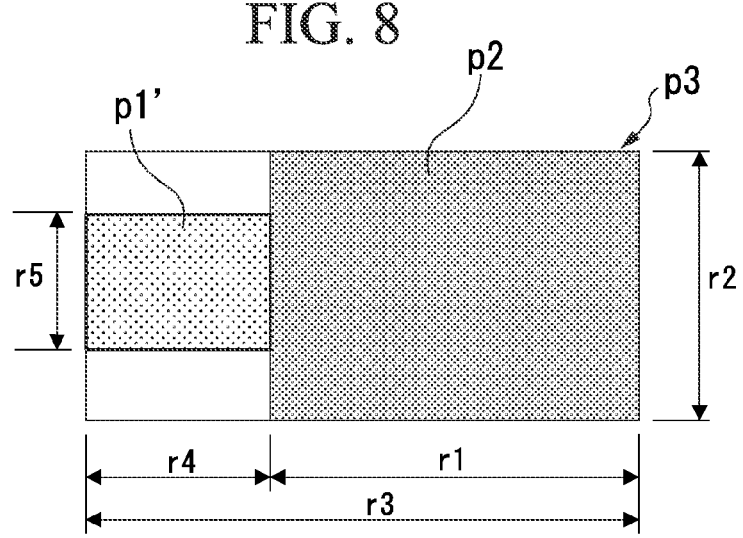
FIG. 8 is a diagram that explains another example of the display image p3 according to the third exemplary embodiment.

FIG. 8 is a diagram for describing another example of the display image p3 according to the present exemplary embodiment. The example shown in FIG. 8 is the case of prioritizing the display image p2 that is contained in the video signal g2 input to the second input unit 11-2 being selected by the user.

The resolutions of the two input images p1 and p2 are the same resolutions as the input images p1 and p2 shown in the upper part of FIG. 6. Also, the resolution of the display image p3 displayed in the display unit 15 (r3 pixels in the horizontal direction×r2 pixels in the vertical direction) is the same resolution as that of the lower portion of FIG. 6.

As shown in FIG. 8, in the case of prioritizing the input image p2 that is contained in the video signal g2 input to the second input unit 11-2, the processing unit 13B arranges it at a position on the right side of the display image p3 without changing the resolution of the input image p2. In the image p3, the r4 pixels in the horizontal direction of the remaining region in which the input image p1 is to be displayed are 640 pixels. For this reason, the processing unit 13A reduces the resolution of the input image p1 to for example 640 pixels× 360 pixels (r4 pixels in the horizontal direction×r5 pixels in the vertical direction). The processing unit 13B displays the reduced image p1' arranged in the remaining region of the image p3.

Next, an example of the processing steps that the display device 1B performs when the video signals g1 and g2 corresponding to the input images p1 and p2 are input shall be described.

Figure 9:
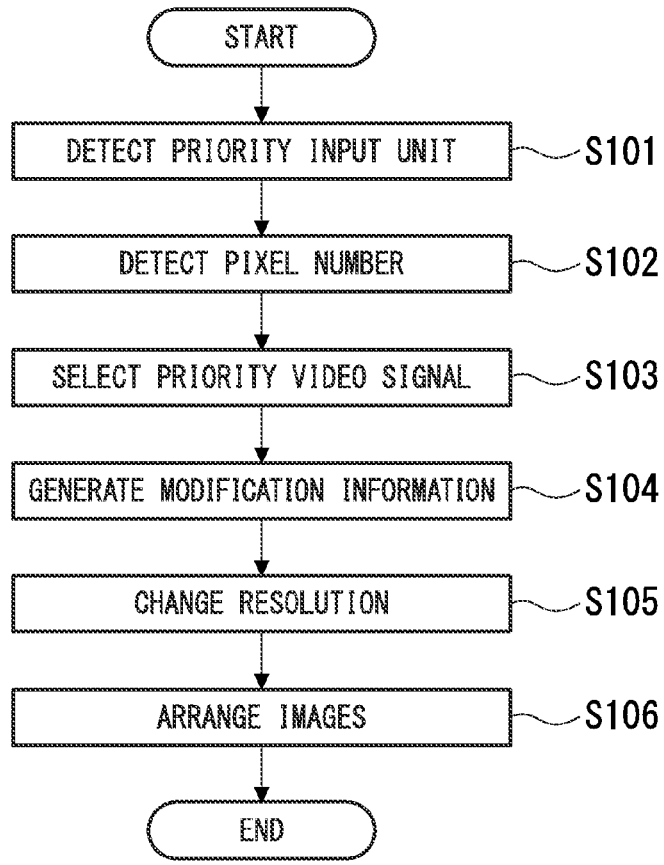
FIG. 9 is a flowchart of the process that the display device according to the third exemplary embodiment performs.

FIG. 9 is a flowchart of the process that the display device 1B according to the present exemplary embodiment performs.

(Step S101) The control unit 131, based on the detection value detected by the detecting unit 14 detects whether the first input unit 11-1 is to be prioritized, or the second input unit 11-2 is to be prioritized. After the completion of Step S101, the control unit 131 advances the processing to Step S102.

(Step S102) The first pixel number detecting unit 121-1 detects the pixel number of the image contained in the video signal g1 input from the first input unit 11-1, and outputs the video information g203-1 that shows the detected pixel number to the control unit 131. Next, the second pixel number detecting unit 121-2 detects the pixel number of the image contained in the video signal g2 input from the second input unit 11-2, and outputs the video information g203-2 that shows the detected pixel number to the control unit 131. After the completion of Step S102, the control unit 131 advances the processing to Step S103.

(Step S103) The switching unit 123 selects the video signal that has been input to the priority input unit in accordance with the selection signal g205 input from the control unit 131, and outputs the selected video signal to the image compositing unit 133. Next, the switching unit 123 outputs the video signal that has been input to the other input unit to the adjusting unit 132, in accordance with the selection signal g205 input from the control unit 131. After the completion of Step S103, the control unit 131 advances the processing to Step S104.

(Step S104) The control unit 131 generates the modification information g208 for the video signal based on the video information g203-1, the video information g203-2 and the user operation detected by the detecting unit 14, and outputs the generated modification information g208 to the adjusting unit 132. The processing of Step S104 shall be described below. After the completion of Step S104, the control unit 131 advances the processing to Step S105.

(Step S105) The adjusting unit 132 changes the resolution of the image contained in the video signal g207 that has been input from the switching unit 123 based on the modification information g208 that has been input from the control unit 131. The adjusting unit 132 outputs the video signal g209 including the image after being changed to the image compositing unit 133.

(Step S106) The image compositing unit 133 arranges the image contained in the video signal g206 at a predetermined position on the display unit 15, in accordance with the arrangement information g210 input from the control unit 131. Next, the image compositing unit 133 arranges the image contained in the video signal g209 after the resolution change in the remaining region of the display image p3, in accordance with the arrangement information g210 input from the control unit 131. Here, the predetermined position is a position in which the left side of the image is aligned with the left side of the display unit 15 as shown in the lower unit of FIG. 6, in the case of the shape of the display unit 15 for example being horizontally long and prioritizing the first input unit 11-1 being selected. Alternatively, the predetermined position is a position in which the right side of the image is aligned with the right side of the display unit 15 as shown in FIG. 8, in the case of the shape of the display unit 15 for example being horizontally long and prioritizing the second input unit 11-2 being selected.

With that, the processing in the image display is completed.

Next, an example of the processing of Step S104 shown in FIG. 9 that the control unit 131 performs shall be described with reference to FIG. 6 and FIG. 7.

In the example shown in FIG. 6, the input unit having priority is the first input unit 11-1. The resolution of the display unit 15 is 2560 pixels horizontal and 1080 pixels vertical. Also, the resolutions of the input image p1 that is contained in the first video signal g1 and the input image p2 that is contained in the second video signal g2 are each 1920 pixels horizontal and 1080 pixels vertical.

The control unit 131 subtracts the resolution of 1920 pixels in the horizontal direction of the input image p1 input to the first input unit 11-1 having priority from the resolution of 2560 pixels in the horizontal direction of the display unit 15. Next, the control unit 131 determines the pixel number difference of 640 pixels obtained by the subtraction to be the pixel number in the horizontal direction for the image p2'. Next, the control unit 131 computes the vertical pixel number 360 (=1080×(640/1920)) that corresponds to the reduction factor in the horizontal direction, in order to maintain the aspect ratio of the input image p2. Next, the control unit 131 determines the computed pixel number of 360 pixels to be the pixel number in the vertical direction for the image p2'. In this way, the control unit 131 generates each pixel number in the horizontal direction and vertical direction as the modification information g208. Alternatively, the control unit 131 may generate a reduction factor (640/1920) as the modification information g208.

In the above manner, in the display device according to the present exemplary embodiment, the processing unit, based on the resolution of the first image and the resolution of the display unit, computes the resolution of the second image, changes the resolution of the second image in accordance with the computed resolution, and displays the image after being changed in the remaining region.

Also, in the display device according to the present exemplary embodiment, the processing unit changes the resolution of the second image without changing its aspect ratio.

Thereby, the display device 1B according to the present exemplary embodiment gives priority to the input unit selected by the user. The display device 1B according to the present exemplary embodiment displays in the display unit 15 the image contained in the video signal input to the priority input unit without changing its resolution. The display device 1B according to the present exemplary embodiment reduces or enlarges the image contained in the video signal input by the other input unit not selected without changing its aspect ratio. The display device 1B according to the present exemplary embodiment displays the reduced or enlarged image in the remaining display region of the display unit 15.

Accordingly, since the display device 1B according to the present exemplary embodiment does not change the resolution of the image contained in the video signal input to the selected input unit, it is possible to display a plurality of images side by side without overlapping and in a manner reducing loss of the information amount of the images in the display region.

In the present exemplary embodiment, the example of the user selecting the input unit having priority has been described, but it is not limited thereto. The input unit having priority may be determined in advance so as to give priority to for example the first input unit 11-1.

Note that in the present exemplary embodiment, the example has been described of the display device 1B including the first input unit 11-1 and the second input unit 11-2, but it is not limited thereto. There may be three or more input units. For example, in the case of the display device 1B including three input units, the control unit 131 does not change the resolution of the image contained in the video signal input from the selected input unit having priority. The control unit 131 may change the resolutions of the images contained in the video signals input from the other input units that are not selected.

In the case of there being three or more input units, the user may select two input units having priority. In this case, the control unit 131 does not change the resolutions of the images contained in the video signals input from the two selected input units having priority. The control unit 131 may change the resolution of the image contained in the video signal input from the remaining input unit.

Also, the case shall be described of there being three input units, and for example only the second input unit 11-2 being selected as the only one input unit having priority. The control unit 131 may be made to arrange the image contained in the second video signal g2 that is input from the second input unit 11-2 at the center position of the display unit 15. The control unit 131 may then perform control so as to change the resolutions of the images contained in the video signals input from the remaining input units and display them in regions arranged to the right and left of the image contained in the second video signal g2.

Note that in the present exemplary embodiment, the example has been described of not changing the resolution of the image contained in the video signal input to the input unit selected by the user, while changing the resolution of the image contained in the video signal input from the other input unit that is not selected, but it is not limited thereto. The processing unit 13B may be made to give priority to the selected input unit and change the resolution of the image contained in the video signal input to the input unit having priority, and not change the resolution of the image contained in the video signal input to the other input unit that is not selected. In this case, the processing unit 13B may be made to change the resolution of the image contained in the video signal input to the selected input unit and display it in the remaining region while displaying the image contained in the video signal input to the other input unit not selected.

Fourth Exemplary Embodiment

In the third exemplary embodiment, the example has been described of not changing the resolution of the image contained in the video signal input to the input unit selected by the user, and changing the resolution of the image contained in the video signal input from the other input unit that is not selected. In the present exemplary embodiment, the effective area of the image that is contained in the video signal input from the other input unit that is not selected is extracted. Then, in the present exemplary embodiment, the image of the extracted effective area is displayed on the display unit side by side without overlapping with the image contained in the video signal input to the input unit selected by the user. Here, an effective area is, as one example, an area having effective information. For example, an effective area is an area other than an area of a predetermined color. Also, in the present exemplary embodiment, an area not having an effective area is called an invalid area.

Figure 10:
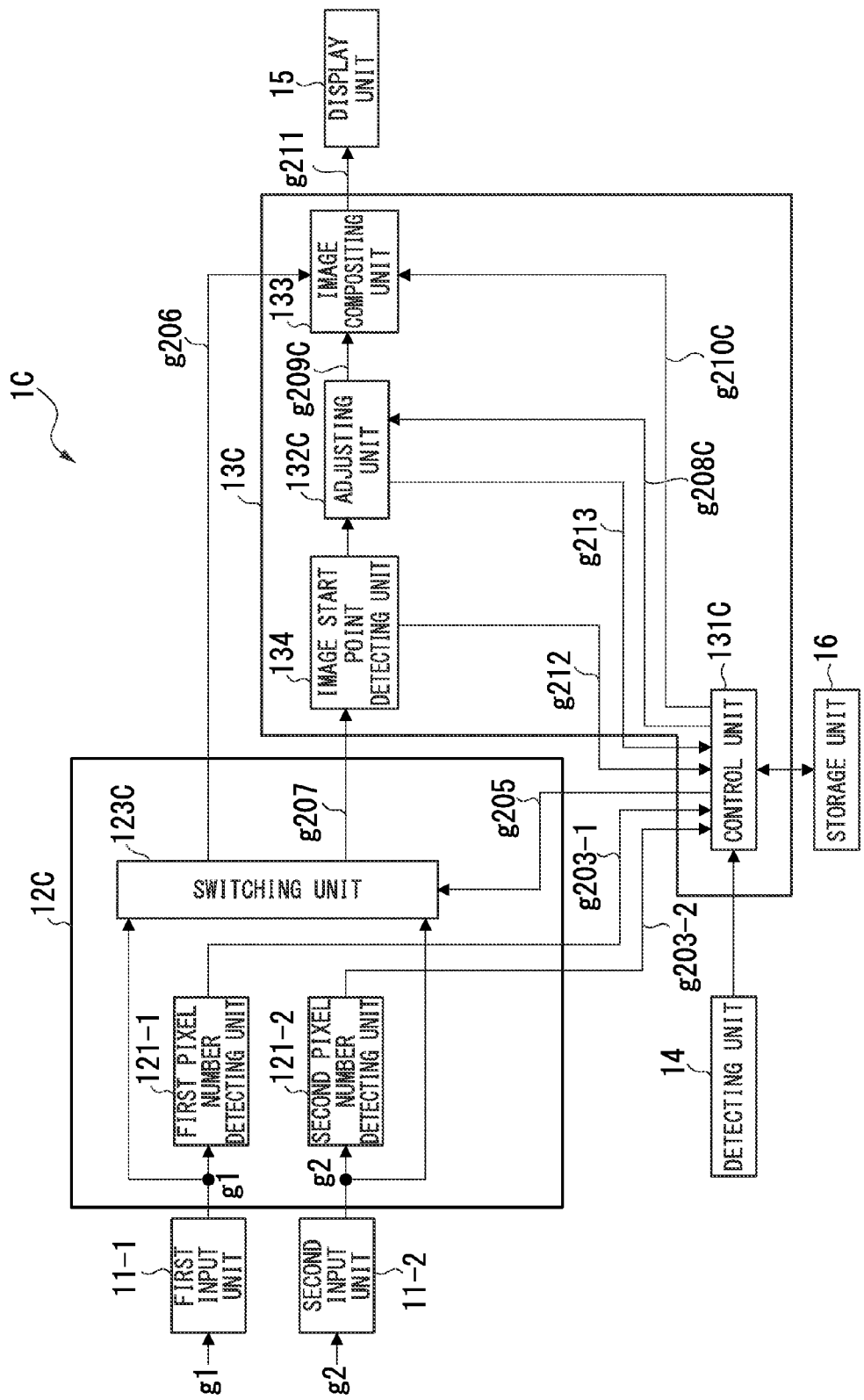
FIG. 10 is a block diagram of the schematic constitution of a display device according to a fourth exemplary embodiment.

FIG. 10 is a block diagram that shows a schematic configuration of a display device 1C according to the present exemplary embodiment. The function units having the same function as the second exemplary embodiment shall use the same reference symbols, with descriptions thereof being omitted.

As shown in FIG. 10, the display device 1C includes the first input unit 11-1, the second input unit 11-2, the selecting unit 12C, a processing unit 13C, the detecting unit 14, the display unit 15, and the storage unit 16. Also, the selecting unit 12C includes the first pixel number detecting unit 121-1, the second pixel number detecting unit 121-2, and a switching unit 123C. The processing unit 13C includes a control unit 131C, an adjusting unit 132C, an image compositing unit 133C, and an image start point detecting unit 134.

The switching unit 123C of the selecting unit 12C selects the first input unit 11-1 or the second input unit 11-2 in accordance with the selection signal g205. The switching unit 123C outputs the video signal input to the selected input unit (called video signal g206) to the image compositing unit 133 of the processing unit 13C in accordance with the selection signal g205. The switching unit 123C outputs the video signal input to the input unit that has been not selected (called video signal g207) to the image start point detecting unit 134 of the processing unit 13C in accordance with the selection signal g205.

The control unit 131C of the processing unit 13C generates the selection signal g205 in accordance with the user operation detected by the detecting unit 14, and outputs the generated selection signal g205 to the switching unit 123C.

The control unit 131C generates modification information g208C based on a vertical video start point, a horizontal video end point, a vertical video start point, and a horizontal video end point of the image contained in the video information input from the image start point detecting unit 134. Note that the generation of the modification information g208C shall be described below. The control unit 131C determines whether or not the image of the effective area that the adjusting unit 132C has extracted can be displayed in the remaining region after displaying the image having priority, based on the resolution information g213 that indicates the resolution of the effective area input from the adjusting unit 132C. The control unit 131C calculates the display magnification in accordance with the determined result, and outputs the computed display magnification to the adjusting unit 132C including the modification information g208C.

The control unit 131C, based on the video information g203-1, the video information g203-2, the effective area information g212, and the user operation detected by the detecting unit 14, generates arrangement information g210C for the image contained in the video signal input to the input unit having priority and for the image that is an enlargement or reduction of the image of the extracted effective area. The control unit 131C outputs the generated arrangement information g210C to the image compositing unit 133.

The control unit 131C stores the video information g203-1, the video information g203-2, the modification information g208, the effective area information g212, the resolution information g213, and the arrangement information g210C in the storage unit 216.

The video information g203-1, the video information g203-2, the modification information g208, the effective area information g212, the resolution information g213, and the arrangement information g210C are stored in the storage unit 216.

The image start point detecting unit 134 detects each start point of the effective area of the image contained in the video signal g207 input from the switching unit 123C, and outputs information that shows each detected start point to the control unit 131C as effective area information g212. Here, each start point of the effective area contained in the video signal g207 is for example the four points of the horizontal video start point, the horizontal video end point, the vertical video start point, and the horizontal video end point. The image start point detecting unit 134 detects each start point of the effective area of an image using publicly known image recognition technology. The image start point detecting unit 134 outputs the video signal g207 input from the switching unit 123C to the adjusting unit 132C.

The adjusting unit 132C extracts an effective area from the image contained in the video signal g207 input from the image start point detecting unit 134, based on the modification information g208C input from the control unit 131C. Extraction of an effective area shall be described later. The image adjusting unit 132C, based on the display magnification contained in the modification information g208C input from the control unit 131C, performs enlargement processing or reduction processing of the effective area image of the image contained in the extracted video signal. The adjusting unit 132C outputs video signal g209C containing the image after the enlargement processing or reduction processing to the image compositing unit 133.

Figure 11:
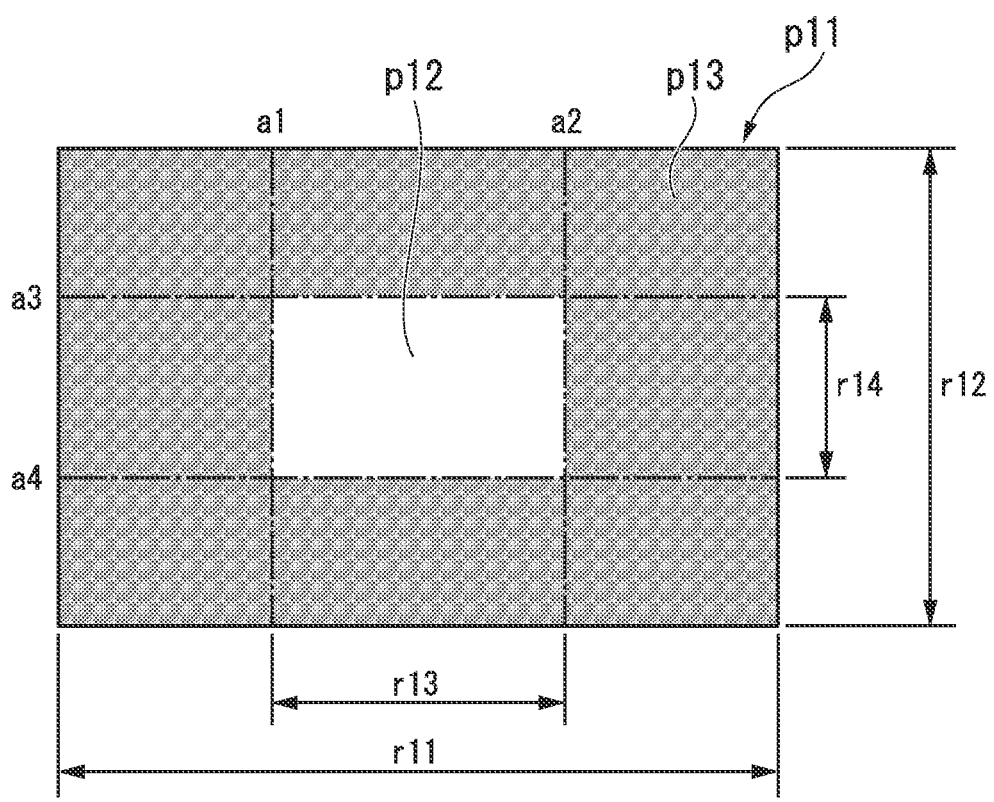
FIG. 11 is a diagram that explains an effective area, and a start point of an effective information portion according to the fourth exemplary embodiment.

FIG. 11 is a diagram for explaining the effective area and the start point of the effective information portion according to the present exemplary embodiment.

The image p11 shown in FIG. 11 is an example of an image that is contained in a video signal that, for example, a video playback device, not illustrated, has output. This video playback device, when outputting an image p12 to the display device 1C, arranges the image p12 for example in the center of the image p11. Next, the video recording playback device, without changing the pixel number of the image p12, generates the image p11 in which a black image area is added at the periphery of the image p12, in conformity with the displayable pixel number of the device 1C. Next, the video recording playback device outputs a video signal that contains the generated image p11 to the display device 1C.

Here, the effective area in the present exemplary embodiment is for example the image area other than the black image area in the image p11. For example in FIG. 11, the image p12 is the image of the effective area in the image p11. Also, in the present exemplary embodiment, the invalid area is for example an image p13 of the portion of the black image area other than the image p12, in the image p11. Note that in regard to the video signal of the black image area, the video signal may contain a video signal with a lower signal level than the predetermined signal level.

In FIG. 11, the resolution of the image p11 (horizontal direction×vertical direction) is r11 pixels×r12 pixels. Also, the resolution of the image p12 (horizontal direction×vertical direction) is r13 pixels×r14 pixels. Also, point a1 shows the horizontal video start point, point a2 shows the horizontal video end point, point a3 shows the vertical video start point, and point a4 shows the horizontal video end point.

Figure 12:
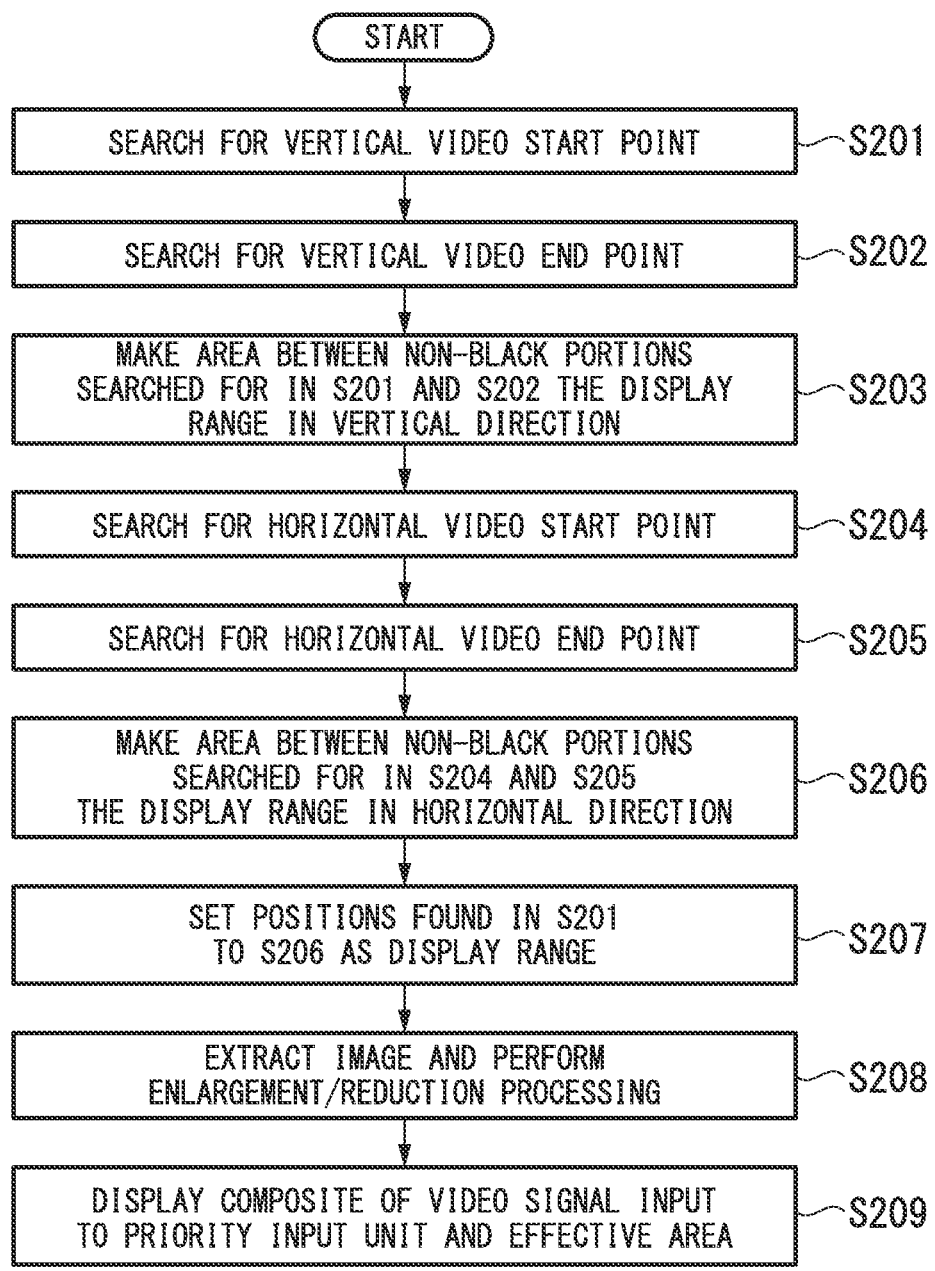
FIG. 12 is a flowchart of the process in image display according to the fourth exemplary embodiment.
Figure 13:
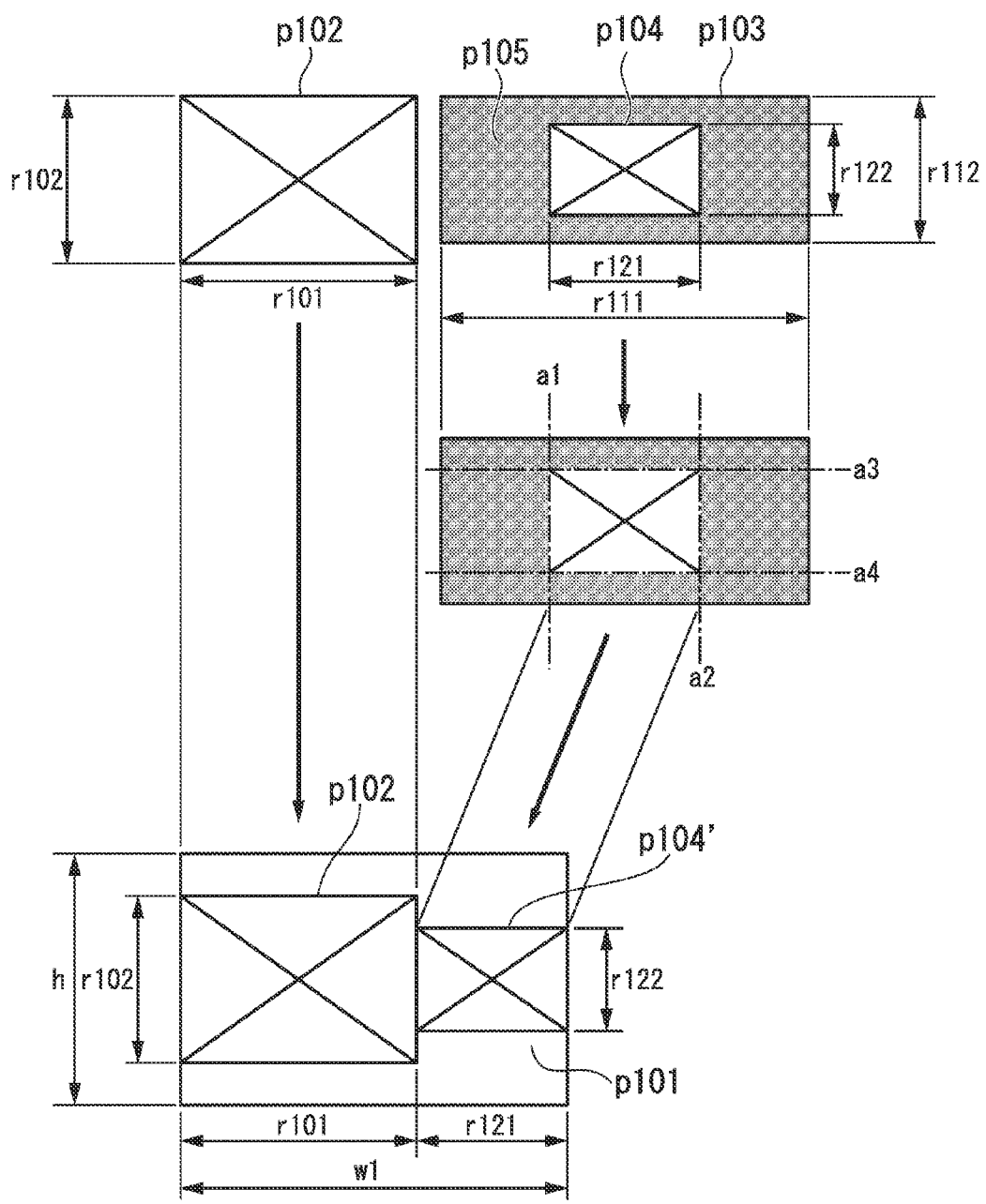
FIG. 13 is a diagram that explains an example of the process in image display according to the fourth exemplary embodiment.

Next, an example of the processing in video display that the selecting unit 12C and the processing unit 13C perform shall be explained with reference to FIG. 12C and FIG. 13C. FIG. 12 is a flowchart of the process in image display according to the present exemplary embodiment. FIG. 13 is a diagram that describes an example of the process in image display according to the present exemplary embodiment. Note that the example shown in FIG. 12 and FIG. 13 is the example of the case of the first input unit 11-1 being selected by the user as the input unit having priority.

In FIG. 13, the image p101 is the image after compositing that is displayed in the display unit 15, the image p102 is the image that is contained in the first video signal g1, and the image p103 is the image that is contained in the second video signal g2. Also, the image p104 is the image of the effective area contained in the second video signal g2, and the image p105 is the image of the invalid area contained in the second video signal g2.

Point a1 to point a4 are the same as the points explained in FIG. 11. In addition, in the second video signal g2, similarly to FIG. 11, the area other than the image p104 is an image of the black image area. Also, in FIG. 13, the resolution (horizontal direction×vertical direction) of the image p102 is r101 pixels×r102 pixels, the resolution of the image p103 is r111 pixels×r112 pixels, and the resolution of the image p104 is r121 pixels×r122 pixels. Also, the resolution (horizontal direction×vertical direction) of the image p101 is w1 pixels×h pixels.

(Step S201) The first pixel number detecting unit 121-1 detects the pixel number of the image p102 contained in the first video signal g1. The second pixel number detecting unit 121-2 detects the pixel number of the image p103 contained in the second video signal g2. Next, the image start point detecting unit 134 searches for the vertical video start point a3 in the image 103. For example, the image start point detecting unit 134 searches for the position in the vertical direction at which the image area that is not the black image area starts, heading from up to down in the vertical direction. The image start point detecting unit 134, after Step S201 ends, advances the processing to Step S202.

(Step S202) The image start point detecting unit 134 searches for the vertical video end point a4 in the image p103. For example, the image start point detecting unit 134 searches for the position in the vertical direction at which the image area that is not the black image area starts, heading from down to up in the vertical direction. The image start point detecting unit 134, after Step S202 ends, advances the processing to Step S203.

(Step S203) The control unit 131C decides the display range in the vertical direction between the vertical video start point a3 and the vertical video end point a4 searched for in Steps S201 and S202. The control unit 131C, after Step S203 ends, advances the processing to Step S204.

(Step S204) The image start point detecting unit 134 searches for the horizontal video start point a1 in the image p103. For example, the image start point detecting unit 134 searches for the position in the horizontal direction at which the image area that is not the black image area starts, heading from left to right in the horizontal direction. The image start point detecting unit 134, after Step S204 ends, advances the processing to Step S205.

(Step S205) The image start point detecting unit 134 searches for the horizontal video end point a2 in the image p103. For example, the image start point detecting unit 134 searches for the position in the horizontal direction at which the image area that is not the black image area starts, heading from right to left in the horizontal direction. The image start point detecting unit 134, after Step S205 ends, advances the processing to Step S206.

(Step S206) The control unit 131C decides the display range in the horizontal direction between the horizontal video start point a1 and the horizontal video end point a2 searched for in Steps S204 and S205. The control unit 131C, after Step S206 ends, advances the processing to Step S207.

(Step S207) The control unit 131C generates information that shows each position and the display ranges found in Steps S201 to S206, and based on the generated display ranges, computes the pixel number of the image p104. Next, the control unit 131C generates the modification information g208C based on the computed pixel number, and outputs the generated modification information g208C to the adjusting unit 132C. The control unit 131C, after Step S207 ends, advances the processing to Step S208.

(Step S208) The adjusting unit 132C, based on the modification information g208C input from the control unit 131C, extracts the image p104 from the image p103. Next, the adjusting unit 132C detects the resolution of the extracted image p104, and outputs the resolution information g213 that indicates the detected resolution to the control unit 131C.

Next, the control unit 131C determines based on the resolution information g213 input from the adjusting unit 132C whether or not the pixel number in the horizontal direction of the image p104 that the adjusting unit 132C extracted is within (w1−r101) pixels. The control unit 131C, in the case of having determined that the pixel number in the horizontal direction of the extracted image p104 is within (w1−r101) pixels, computes the display magnification when enlarging the image p104 in the horizontal direction (w1−r101)/r121. In this case, the control unit 131C decides on the same value for the enlargement factors in the horizontal direction and vertical direction in order to retain the aspect ratio. Next, the control unit 131C includes the computed display magnification in the modification information g208C and outputs it to the adjusting unit 132C. Note that in the case of r121 pixels and (w1−r101) pixels being equivalent, the display magnification is 1 time.

The control unit 131C, in the case of determining the pixel number in the horizontal direction of the extracted image p104 to not be within (w1−r101) pixels, computes the display magnification when reducing the image p104 in the horizontal direction r121/(w1−r101). Next, the control unit 131C includes the computed display magnification in the modification information g208C and outputs it to the adjusting unit 132C.

Next, the adjusting unit 132C, in response to the display magnification contained in the modification information g208C input from the control unit 131C, performs an enlargement process or reduction process on the image of the extracted effective area. The adjusting unit 132C, after Step S208 ends, advances the processing to Step S209.

(Step S209) The image compositing unit 133, based on the arrangement signal g210C input from the control unit 131C, arranges the image 102C at a position of left end w=0 in the horizontal direction of the image p101 and arranges the center in the vertical direction at a position of half of pixels h in the vertical direction of the image p101. Next, the image compositing unit 133, based on the arrangement signal g210C from the control unit 131C, arranges the left end in the horizontal direction of the image p104', which is the enlarged or reduced image p104, at the position of w=r101 pixels, and arranges the center in the vertical direction at the position of half of the h pixels of the resolution in the vertical direction of the image p101.

Thereby, the processing in image display ends.

Hereinbelow, an example of the processing in Steps S201 to S209 shall be described with reference to FIG. 12 and FIG. 13. In the following example, the resolution (horizontal direction×vertical direction) of the image p101 is 2560 pixels×1080 pixels, and the resolution of the image p102 is 1920 pixels×1080 pixels. The resolution of the image p103 is 1280 pixels×720 pixels, and the resolution of the image p104 of the effective area is 640 pixels×480 pixels.

The first pixel number detecting unit 121-1 detects the pixel number 1920×1080 of the image p102. The second pixel number detecting unit 121-2 detects the pixel number 1280×720 of the image p103. Next, the image start point detecting unit 134 searches for the vertical video start point a3 (=120 pixels) in the image p103 (Step S201).

The image start point detecting unit 134 searches for the vertical video end point a4(=600 pixels) in the image p103 (Step S202).

The control unit 131C makes the interval from the vertical video start point a3 (=120 pixels) to the vertical video end point a4 (=600 pixels) the display range in the vertical direction (Step S203).

The image start point detecting unit 134 searches for the horizontal video start point a1 (=320 pixels) in the image p103 (Step S204).

The image start point detecting unit 134 searches for the horizontal video end point a2 (=960 pixels) in the image p103 (Step S205).

The control unit 131C makes the interval from the horizontal video start point a1 (=320 pixels) to the horizontal video end point a2 (=960 pixels) the display range in the vertical direction (Step S206).

The control unit 131C computes the resolution in the horizontal direction of the image p104 as 640 (=960−320)

pixels×480 (=600−120) pixels. Next, the adjusting unit 132C, based on the modification information g208C input from the control unit 131C, extracts the image p104 from the image p103 (Step S207).

The adjusting unit 132C judges whether or not the 640 pixels in the horizontal direction of the image p104 are within the 640 pixels (2560−1920) of the remaining region, based on the resolution information g13 that the control unit 131C has output. Since the 640 pixels in the horizontal direction of the image p104 are equal with the 640 pixels (2560−1920) of the remaining region, the adjusting unit 132C decides on a display magnification of 1 time for the image p104 and so performs neither enlargement processing nor reduction processing (Step S208).

The image compositing unit 133 arranges the image p102 at a position of left end w=0 in the horizontal direction of the image p101 and arranges the center in the vertical direction at a position of 540 pixels, which is half of the 1080 pixels in the vertical direction of the image p101. Next, the image compositing unit 133 arranges the left end in the horizontal direction of the image p104 at the position of 1920 pixels, which is the right end of the image p102, and arranges the center in the vertical direction at the position of 540 pixels, which is half of the image p101 in the vertical direction (Step S209).

With the above processing, the display device 1C of the present exemplary embodiment displays side by side without overlapping in the long direction of the display unit 15 the image p102 contained in the video signal input to the selected input unit and the image p104 of the effective area extracted from the image p103 contained in the video signal input to the input unit that is not selected.

Note that in Step S208, the control unit 131C may determine whether or not the image p102 and the image p103 can be displayed side by side without overlapping in the display unit 15 prior to extracting the image p104 from the image p103. In this case, the control unit 131C, for example, based on the pixel numbers that the first pixel number detecting unit 121-1 and the second pixel number detecting unit 121-2 have detected, determines whether or not the image p102 and the image p103 can be displayed side by side so as not to overlap in the display unit 15. Then, in the case of determining that the images cannot be displayed side by side so as not to overlap, the control unit 131C may control the adjusting unit 132C so as to extract the image p104 of the effective area from the image p103.

In the case of displaying the entire image p103 in the remaining region of the display unit 15, (w1−r101)×h, in FIG. 13 by performing a reduction process on it, the pixel number of the image p104' that is displayed in the display unit 15 becomes 640×360 due to the reduction processing that is performed. For this reason, regarding the image p104' that is displayed in the display unit 15, since the image p103 is reduced to 25 percent of its size, 75 percent of information is lost.

On the other hand, in the display device 1C of the present exemplary embodiment, the image p104, which consists of the effective area extracted from the image p103, is displayed in the remaining region of the display unit 15 (w1−r101)×h. As a result, compared to the case of simply reducing and displaying the image p103, the image p104 that is displayed in the display unit 15 enables a reduction in the loss of the information amount.

Also, in FIG. 13, if for example the user were to perform the work of extracting an image of a pixel number that is displayable in the remaining region of the display unit 15 (w1−r101)×h while observing the image of the display unit 15, it would be extremely time consuming.

On the other hand, in the display device 1C of the present exemplary embodiment, the effective area is automatically extracted from the image p103, and the extracted image p104 is displayed in the display unit 15. As a result, there is the effect of an improvement in the work efficiency of the user.

Note that in the present exemplary embodiment, the example has been described of arranging the image p102 at the position of the left side of the display unit 15, and arranging the image p104 in the remaining region on the right side of the display unit 15. With this kind of arrangement, information g210C that shows the positions of arrangement may be contained in the modification information g208 that the control unit 131 outputs, in accordance with the result of the user having operated the detecting unit 14.

Also, in the case of the display unit 15 having a vertically long shape in which the vertical direction is the long direction, and the horizontal direction is the short direction, for example the image p102 may be arranged at the upper side, and the image p104 may be displayed in the remaining region.

Also, in the example shown in FIG. 12 and FIG. 13, the example has been described of giving priority to the first input unit 11-1, but priority may also be given to the second input unit 11-2 in the same manner as the second and third exemplary embodiments.

Also, in the present exemplary embodiment, the case has been described of two video signals being input, but there may be three or more video signals that are input. In this case, for example, the display device 1C, based on the result of a user operation that the detecting unit 14 has detected, may be made to decide the two images to be displayed in the display unit 15. Alternatively, the display device 1C may be made to display side by side without overlapping the images that are contained in all of the video signals that are input. In this case, the display device 1C may be made to decide the priority order of display in the display unit 15 based on the operation result of the user that the detecting unit 14 has detected. The display device 1C may display the images contained in two video signals with a high priority order, and display in the remaining region an image of the effective area extracted from an image contained in a video signal that has not been selected. Alternatively, the display device 1C may extract images of the effective areas from the images contained in two or more video signals among the video signals that have been input, and display the extracted images side by side without overlapping.

Also, in the present exemplary embodiment, in the case of overlapping of images occurring when displaying in the display unit 15 side by side without overlapping the image of an effective area and another image, an example has been described of reducing the image of the effective area, but the exemplary embodiment is not limited to this. The adjusting unit 132C is not limited to an enlargement or reduction process, and may also perform, for example, a process of thinning out pixels, and may also further extract a portion of the image of the effective area depending on the application.

Also, in the present exemplary embodiment, the example has been described of the control unit 131C computing the pixel number of the extracted image p104, but for example the image start point detecting unit 134 may perform the computation of the pixel number. Also, in the present exemplary embodiment, the example has been described of the constitution in which the selecting unit 12C and the processing unit 13C are separated, but for example, a constitution in which the selecting unit 12C includes the processing unit 13C is also possible.

Also, in the present exemplary embodiment, as the invalid area, an example of a black image area has been described, but it is not limited thereto. The invalid area may be an area of any color. For example, in FIG. 11, in the case of the invalid area p13 being a blue region, the image start point detecting unit 134 may be made to detect as the image start point or the image end point signal level positions outside a range that includes a signal level corresponding to a blue color determined in advance. Alternatively, the image start point detecting unit 134 may be made to detect as the image start point or image end point positions within a range of signal levels that correspond to other than a predetermined blue color. Note that the image start point detecting unit 134 may also be made to detect a black image area or an image area of another color based on the RBG (red, blue, green) values, in the case of the input signal being a digital signal. In this case, the RBG (red, green, blue) values correspond to the signal levels.

Also, the area other than the effective area is not limited to an area of a predetermined color, and for example may also be a predetermined pattern image such as a hash or mesh.

Also, in the present exemplary embodiment, the example has been described of detecting the video start point or the video end point of the effective area, but it is not limited thereto. The image start point detecting unit 134, for example, may also be made to extract the effective area from the image contained in a video signal, and detect the position of each end unit of the extracted effective area as the image start point or the image end point.

Also, in the present exemplary embodiment, in the example shown in FIG. 13, the example has been described of arranging the position of the center of each of the image p102 and the image p104 in the vertical direction at the position of the center of the display unit 15 in the vertical direction, but it is not limited thereto. The position of the center of the image p102 and the image p104 in the vertical direction may also be a position other than the center of the display unit 15 in the vertical direction. Also, the display device 1C may be made to arrange the position of the center of the image p102 and the position of the center of the image p104 in the vertical direction at different positions.

As given above, in the display device of one aspect of the present invention, the processing unit detects the effective area from the second image, extracts the effective area detected from the second image, and displays the effective area image obtained by extraction in the remaining region.

With this kind of constitution, the display device of the one aspect of the present exemplary embodiment can display side by side a plurality of images in a manner reducing loss of the information amount of the images in the display region.

Also, the display device of the one aspect of the present exemplary embodiment detects as the effective area an area of a range in which the signal level of the image is defined beforehand.

Also, in the display device of the one aspect of the present exemplary embodiment, the processing unit detects the effective area by detecting the start point and end point of the effective area in the vertical direction of the second image, and detecting the start point and end point of the effective area in the horizontal direction of the second image.

Also, the display device of the one aspect of the present exemplary embodiment includes a pixel number detecting unit that detects the pixel number of an image that has been input, and the processing unit, based on the pixel number that the pixel number detecting unit has detected, determines whether or not the second image can be displayed in the remaining region. In the case of determining that the second image cannot be displayed in the remaining region, it extracts the detected effective area from the second image.

With this kind of constitution, the display device of one aspect of the present exemplary embodiment can automatically detect the effective area. As a result, the convenience for the user improves.

Fifth Exemplary Embodiment

In the present exemplary embodiment, the example shall be described of, in the case of n (n being an integer of 1 or greater) video signals being input to a display device 1D, displaying them side by side on the display unit without overlapping.

Figure 14:
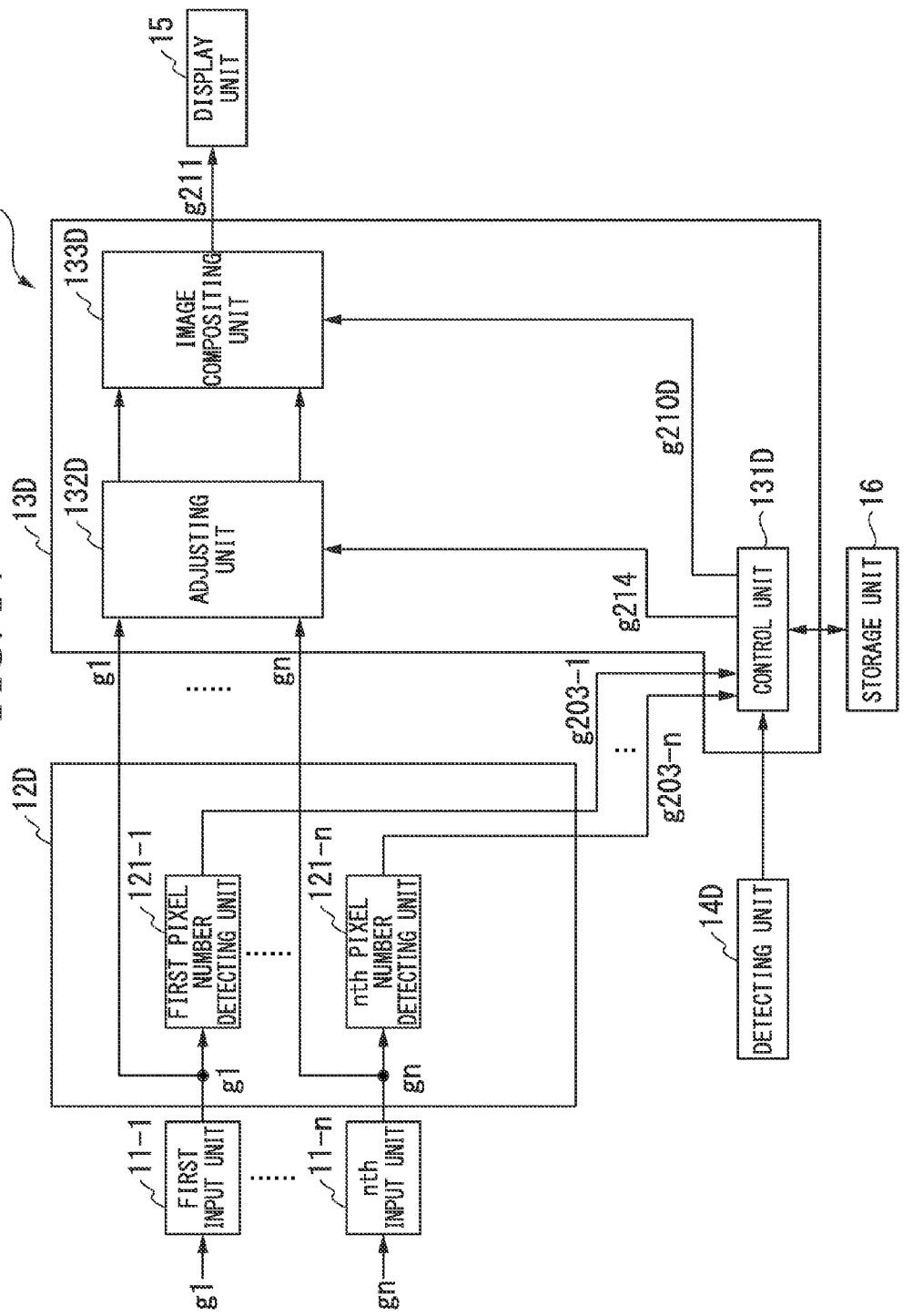
FIG. 14 is a block diagram of the schematic constitution of a display device according to a fifth exemplary embodiment.

FIG. 14 is a block diagram of a schematic configuration of the display device 1D according to the present exemplary embodiment. As shown in FIG. 14, the display device 1D includes the first input unit 11-1, the nth input unit 11-*n*, a selecting unit 12D, a processing unit 13D, a detecting unit 14D, the display unit 15, and the storage unit 16. Also, the selecting unit 12D includes the first pixel number detecting unit 121-1 and an nth pixel number detecting unit 121-*n*. The processing unit 13D includes a control unit 131D, an adjusting unit 132D, and an image compositing unit 133D. Note that function units having the same function as those of the display device 1 shown in the first exemplary embodiment shall use the same reference symbols, with descriptions thereof being omitted. Note that the processing unit 13D may include the first pixel number detecting unit 121-1 and the nth pixel number detecting unit 121-*n*.

The first input unit 11-1 outputs the first video signal g1 that has been input thereto to the selecting unit 12D. The nth input unit 11-*n* outputs the nth video signal gn that has been input thereto to the selecting unit 12D. The first input unit 11-1 to the nth input unit 11-*n* include for example a video input terminal. Also, the first input unit 11-1 to nth input unit 11-*n*, in the case of the input video signal being an analog signal, may convert the analog signal to a digital signal, and output the converted video signal to the selecting unit 12D.

The first pixel number detecting unit 121-1 detects the pixel number of the image contained in the first video signal g1 input from the first input unit 11-1, and outputs information showing the detected pixel number to the control unit 131D of the processing unit 13D as video information g203-1.

The nth pixel number detecting unit 121-*n* detects the pixel number of the image contained in the nth video signal gn input from the nth input unit 11-*n*, and outputs information showing the detected pixel number to the control unit 131D as video information g203-*n*.

The detecting unit 14D detects the user's selection of a desired input unit or designation of a preferred input unit by operation of a button switch of the display device body or remote control or on-screen display and the like. The detecting unit 14D outputs priority information indicating the user's selection of desired input unit and designation of a preferred input unit that have been detected to the control unit 131D of the processing unit 13D.

The video information g203-1, . . . , g203-*n* are input from the selecting unit 12D to the control unit 131D, and the priority information is input from the detecting unit 14D to the control unit 131D. The control portion 131D reads out the resolution of the display unit 15 stored in the storage unit 16. Note that the control unit 131D may be made to detect the resolution of the display unit 15 based on the video signals to be displayed in the display unit 15. The control unit 131D judges whether or not it is possible to display the images contained in the first to nth video signals g1 to gn side by side without overlapping in the display unit, without changing the resolutions of the images, based on the resolution of the display unit 15 that has been read out and the video information g203-1, ..., g203-n.

The control unit 131D, in the case of judging that it is possible to display the images side by side in the display unit 15 without changing the resolutions of the images contained in the first to nth video signals g1 to gn, generates resolution information g214 that shows no change to the resolutions of the images contained in the first to nth video signals g1 to gn, and outputs the resolution information g214 that has been generated to the adjusting unit 132D. Moreover, the control unit 131D decides on the arrangement for displaying the images contained in the first to nth video signal g1 to gn on the display unit 15 side by side without overlapping each other, and outputs the decided arrangement information g210D to the image compositing unit 133D. Note that a change of the resolution of an image refers to performing enlargement or reduction of the image. Also, the image that is contained in a video signal is the video that the video signal shows, and is other than for example the synchronization signal and control signal and the like contained in the video signal.

The control unit 131D, in the case of having determined that the images cannot be displayed side by side without overlapping in the display unit 15 without changing the resolution of the image contained in the first to nth video signals g1 to gn, generates resolution information g214 that shows the resolution to which the images of the second priority and lower are to be changed, without changing the resolution of the image of the highest priority order, among the images contained in the first to nth video signals g1 to gn, and outputs the generated resolution information g214 to the adjusting unit 132D. Note that the computation method of the resolution of the images shall be described below. Also, the control unit 131D decides on the arrangement for displaying side by side without overlapping each other on the display unit 15 the images contained in the first to nth video signals g1 to gn, and outputs the decided arrangement information g210D to the image compositing unit 133D.

The adjusting unit 132D, in response to the resolution information g214 that the control unit 131D has output, changes the resolution of each image contained in the first to nth video signals g1 to gn, and outputs each image data contained in the first to nth video signals g1 to gn whose resolution has been changed to the image compositing unit 133D. Note that in the case of information not to change the resolutions being contained in the resolution information g214, the adjusting unit 132D, without changing the resolutions of the images that indicate no change to their resolutions, outputs each image data contained in the first to nth video signals g1 to gn whose resolutions are unchanged to the image compositing unit 133D.

The image compositing unit 133D, in response to the arrangement information g210D input from the control unit 131D composites each image data whose resolution has been changed (or unchanged) contained in the first to nth video signals g1 to gn input from the adjusting unit 132D so as to display them side by side without overlapping on the display unit 15. The image compositing unit 133D displays a composited image g211 in the display unit 15.

Figure 15:
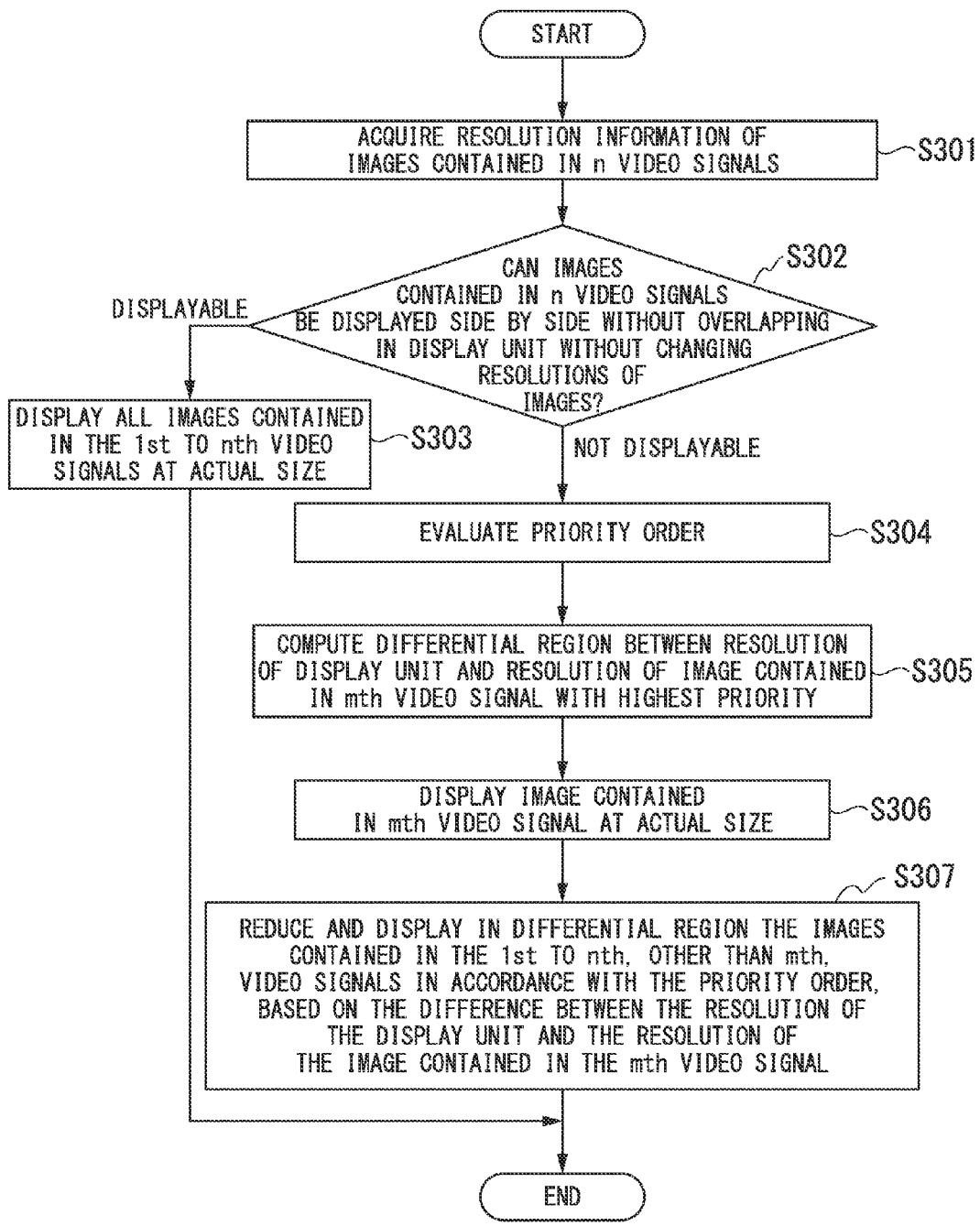
FIG. 15 is a flowchart of the process in image display according to the fifth exemplary embodiment.

Next, an example of the processing in image display that the selecting unit 12D and the processing unit 13D perform shall be described with reference to FIG. 15. FIG. 15 is a flowchart of the processing in image display according to the present exemplary embodiment. Note that in the following example, all the resolutions of the first to nth video signals input to the display device 1D shall be assumed to be less than the resolution of the display device 1D.

(Step S301) The first pixel number detecting unit 121-1 to nth pixel number detecting unit 121-n detect the resolutions of the images contained n the video signals g1 to gn input from the first input unit 11-1 to the nth input unit 11-n, respectively, and output the video information g3-1 to g3-n indicating the detected resolution information to the control unit 131D. Note that the resolution of the video indicates the pixel number of the video image. When Step S301 ends, the control unit 131D advances the processing to Step S302.

(Step S302) The control unit 131D determines whether or not it is possible to display n images in the display unit 15 side by side without overlapping, without changing the resolutions of the images contained in the n video information g3-1 to g3-n obtained by the first pixel number detecting unit 121-1 to nth pixel number detecting unit 121-n. The control unit 131D, in the case of determining that it is possible to display n images in the display unit 15 side by side without overlapping, without changing the resolutions of the n images (Step S302: Displayable), advances to Step S303. On the other hand, the control unit 131D, in the case of determining that it is not possible to display n images in the display unit 15 side by side without overlapping, without changing the resolutions of the n images (Step S302: Not displayable), advances to Step S304.

(Step S303) The control unit 131D performs control so as to display all of the images contained in the first to nth video signals g1 to gn on the display unit 15 at their actual size. When Step S303 ends, the control unit 131D ends the processing.

Note that when displaying n images on the display unit 15 side by side without overlapping, the display device 1D performs control so as to display the image with the highest priority on the display unit 15 without changing its resolution. Then, the display device 1D performs control so as to display the remaining images side by side in the vertical direction without overlapping in the differential region after displaying the image with the highest priority, without changing their resolutions. Alternatively, it may perform control so as to display in the differential region the remaining images side by side in the horizontal direction without overlapping.

(Step S304) The control unit 131D detects the priority order of the nth video signal gn based on the detection value that the detecting unit 14D has detected. After Step S304 ends, the control unit 131D advances the processing to Step S305.

Figure 16:
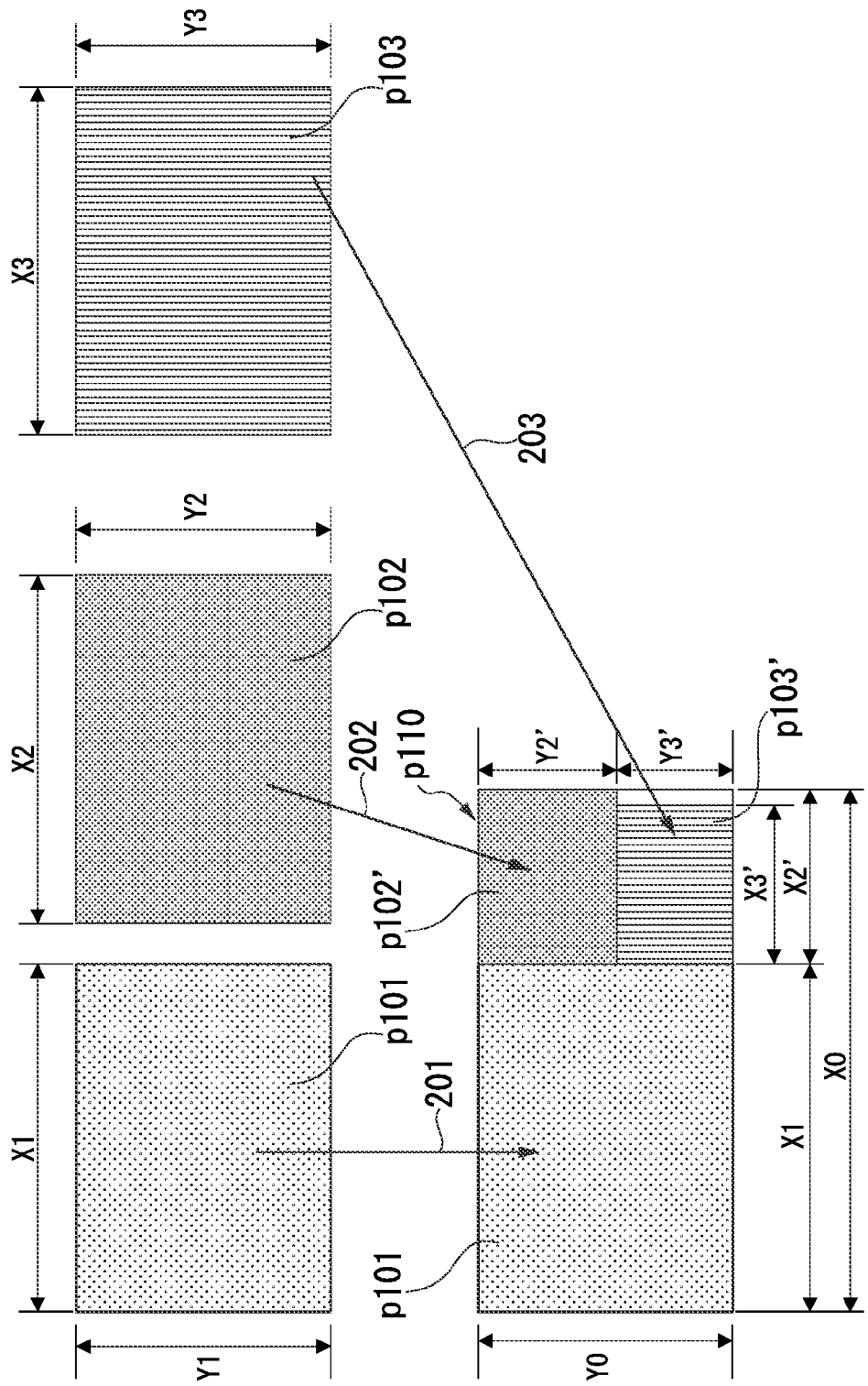
FIG. 16 is a diagram that explains an example of input images and display images according to the fifth exemplary embodiment.

(Step S305) The control unit 131D computes the resolution of the differential region between the output resolution X0×Y0 of the display unit 15 and the resolution Xm×Ym of the image contained in the mth video signal in which the highest priority order has been detected. The resolution of the differential region, in the case of the there being a differential region in the horizontal direction as shown in FIG. 16, is (X0−Xm)×Y0, and in the case of a differential region in the vertical direction, is X0×(Y0−Ym). After Step S305 ends, the control unit 131D advances the processing to Step S306.

(Step S306) The control unit 131D displays at the actual size the image contained in the mth video signal for which the highest priority has been detected on the display unit 15. After Step S306 ends, the control unit 131D advances the processing to Step S307.

(Step S307) The control unit 131D, based on the resolution of the differential region calculated in Step S305, performs control so as to display in a reduced manner in the differential region the images contained in the first to nth video signals other than the mth in accordance with the priority order detected in Step S304. After Step S307 ends, the control unit 131D ends the processing.

Next, an example of the process shown in FIG. 15 that the control unit 131D performs shall be described with reference to FIG. 16. FIG. 16 is a diagram that describes an example of the input images and display images according to the present exemplary embodiment. In the example shown in FIG. 16, the example shall be described of three video signals being input to the display device 1D. Here, the resolution of the display unit is X0×Y0, and the resolution of the image p101 contained in the first video signal is X1×Y1. Also, the resolution of the image p102 contained in the second video signal is X2×Y2, and the resolution of the image p103 contained in the third video signal is X3×Y3. Also, the resolution Y1 in the vertical direction of the image p101 is equal to the resolution Y0 in the vertical direction of the display unit 15, and the resolution X1 in the horizontal direction of the image p101 is less than the resolution X0 in the vertical direction of the display unit 15.

In Step S302, the control unit 131D computes the sum ΣX of the resolutions in the horizontal direction of the images p101 to p103 (=X1+X2+X3), and the sum ΣY of the resolutions in the vertical direction of the images p101 to p103 (=Y1+Y2+Y3). In this example, the sum ΣX of the resolutions in the horizontal direction exceeds the resolution X0 in the horizontal direction of the display unit 15, and moreover the sum ΣY of the resolutions in the vertical direction exceeds the resolution Y0 in the vertical direction of the display unit 15. For this reason, the control unit 131D determines that the three images cannot be displayed side by side without overlapping in the display unit 15, without changing the resolutions of the three images. Note that in this example, it is assumed that the highest priority is set to the first video signal g1, the priority level is set to second for the second video signal g2, and the priority level is set to third for the third video signal g3.

Next, the control unit 131D acquires the priority orders of the first to third video signals g1 to g3 (Step S303). Next, the control portion 131D computes the resolution (X0−X1)×Y0 of the differential region after displaying at actual size the image p101 contained in the first video signal g1 on the display unit 15 (Step S305).

Next, the control unit 131D performs control so as to display at actual size the image p101 contained in the first video signal, brought to for example the left side of the display unit 15 (Step S306).

Next, the control unit 131D performs control so as to reduce and display in the differential unit the image p102 contained in the second video signal g2 with the second priority order. As a result, the resolution of the image p102 is reduced in the manner of p102′ to X2′ (X2′ being less than X2)×Y2′ (Y2′ being less than Y2). The resolution of the differential region of the display unit 15 at this point in time is (X0−X1)×(Y0−Y2′).

Next, the control unit 131D performs control so as to reduce and display in the differential unit the image p103 contained in the third video signal g3 with the third priority order. As a result, the resolution of the image p103 is reduced in the manner of image p103′ to X3′ (X3′ being less than X3)×Y3′ (Y3′ being less than Y3).

Note that in the example shown in FIG. 16, the example is described of displaying the remaining images side by side in the vertical direction without overlapping, in the remaining differential region after displaying the image with the highest priority level, but it is not limited thereto. In accordance with the resolution of the display device 1D and the resolutions contained in the video signals that are input, all the images may be displayed side by side in the horizontal direction without overlapping.

For example, in the case of there being four video signals that are input, the display device 1D first displays the image contained in the highest priority video signal at the actual size, and at the side thereof may reduce and display the image contained in the video signal with the second priority level. Moreover, the display device 1D may reduce the image contained in the video signal with the third priority order and display it at the side of the image contained in the video signal with the second priority order. The display device 1D may reduce the image contained in the video signal with the fourth priority order and display it above or below the image contained in the video signal with the third priority order.

In this way, the arrangement position of an image contained in a video signal may be arranged for example in accordance with the purpose of the user of the display device 1D.

Also, the control unit 131D, after performing control so as to for example reduce and display the image p102 by changing the resolution of the image p102 with the second priority level, may be made to search for a contiguous region within the displayable region on the display unit 15 where the value of the reduction factor of the image p103 is a maximum. Note that with regard to the value of the reduction factor, 1 represents the actual size with no reduction, and the closer to 1 the less the reduction, while the closer to 0 the more the reduction. The control unit 131D, based on the result of the search, may decide to arrange the image that is a reduction of the image p103 with the third priority level side by side in the horizontal direction of the reduced image p102′ without overlapping, or arrange it side by side in the vertical direction (above or below) of the image p102′ without overlapping.

Figure 17:
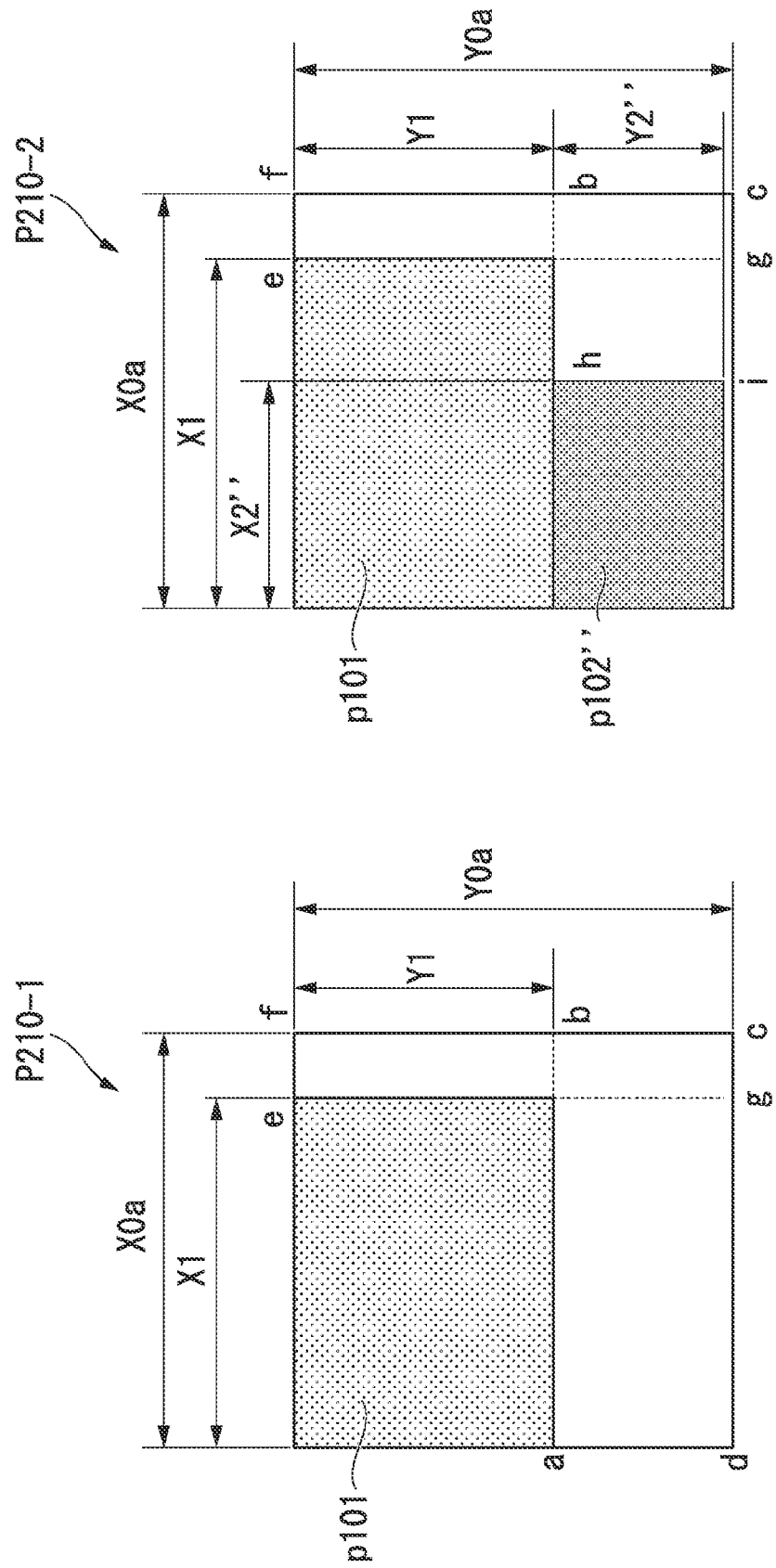
FIG. 17 is a diagram that explains another example of input images and display images according to the fifth exemplary embodiment.

Next, an example shall be described of the resolution of the display unit 15 being vertically long, that is, Y0 being greater than X0. FIG. 17 is a diagram for describing another example of the input images and display images according to the present exemplary embodiment. Note that the resolutions of the images p101 to p103 contained in the video signals that are input are the same as in FIG. 16. The resolution of the display unit 15 is X0a×Y0a, with Y0a being greater than X0a. Also, the resolution X0a in the horizontal direction is greater than the resolution X1 in the horizontal direction of the image p101, and the resolution Y0a in the vertical direction is greater than the resolution Y1 in the vertical direction of the image p101. Also, the priority order is assumed to be the same as in FIG. 16. For this reason, the control unit 131D determines that the three images cannot be displayed side by side without overlapping in the display unit 15 without changing resolutions of the three images (Step S302).

The control unit 131D first displays the image p101 contained in the first video signal g1 that has the highest priority brought to, for example, the upper left corner of the display unit 15 (Step S3). In the case of displaying the image p101 on the display unit 15, the image P210-1 results.

After display of the image p101, the regions in which the image p102 contained in the second video signal g2 with the second priority level can be reduced and displayed are the region enclosed by the points abcd and the region enclosed by the points efcg. The control unit 131D computes the reduction factors in the case of displaying the image p102 in these two regions. The control unit 131D, based on the computed result, displays the image p102", which is the reduced image p102, in the region enclosed by the points abcd for which the value of the reduction factor is larger. As a result, the image P210-2 is displayed on the display unit 15. As shown in the image P210-2, the resolution of the image p102 is reduced to X2" (X2" being less than X2)×Y2" (Y2" being less than Y2) in the manner of the image p102".

After the display of the image p102, the regions in which the image p103 contained in the third video signal g3 with the third priority level can be reduced and displayed are the region enclosed by the points hbci and the region enclosed by the points efcg. The control unit 131D computes the reduction factors in the case of displaying the image p103 in each of these two regions. The control unit 131D, based on the computed result, performs control so as to display the image p103", which is the reduced image p103, in the region enclosed by the points hbci for which the value of the reduction factor is larger. The resolution of the image p103 is reduced to X3" (X3" being less than X3)×Y3" (Y3" being less than Y3) in the manner of the image p103", which is displayed in the region enclosed by the points hbci.

As given above, the display device 1D of the present exemplary embodiment displays the highest priority video image on the display unit 15 without changing its resolution in the case of having determined that it is possible to display n images side by side without overlapping in the display unit 15 without changing the resolutions of the n images contained in the first to nth video signals. Then, in the display device 1D of the present exemplary embodiment, the images contained in the remaining video signals are sequentially displayed side by side so as not to overlap based on the priority order in the differential regions that remain after displaying the image contained in the highest priority video signal. Thereby, according to the display device 1D of the present exemplary embodiment, since it is possible to display side by side without overlapping the images contained in the plurality of video signals that are input at resolutions of for example a minimum or greater resolution set by the user, it is possible to ensure the ease of viewing of videos when displaying a plurality of videos on one screen.

Note that in the present exemplary embodiment, the example has been described of the adjusting unit 132D of the processing unit 13D changing the resolutions of the images contained in the first video signal g1 to the nth video signal gn input to the display device 1D, but it is not limited thereto.

For example, as shown in FIG. 7, the selecting unit 12D may include a switching unit. In this case, the switching unit, in accordance with an instruction from the control unit 131D, may output the video signal whose resolution is not to be changed to the image compositing unit 133D, and output the video signal whose resolution is to be changed to the adjusting unit 132D.

Also, in the present exemplary embodiment, the example was described of not changing the resolution of the image contained in the highest priority video signal, and changing the resolutions of the images contained in the remaining video signals, but it is not limited thereto. If it is possible to display in the display unit 15 side by side without overlapping the images contained in the n video signals, the resolutions of the images contained in the video signals with the highest priority and the second priority order may not be changed, while the resolutions of the images contained in the remaining video signals may be changed. In this case as well, the control unit 131D controls the resolution and arrangement of each image so as to be able to display the images contained in the n video signals side by side in the display unit without overlapping.

Sixth Exemplary Embodiment

In the fifth exemplary embodiment, the example has been described of the resolutions of n video signals g1 to gn that are input to the display device 1D being within the resolution of the display device 1D. In the present exemplary embodiment, the example shall be described of the resolutions of the n video signals g1 to gn input to the display device 1D being greater than the resolution of a display device 1E.

Figure 18:
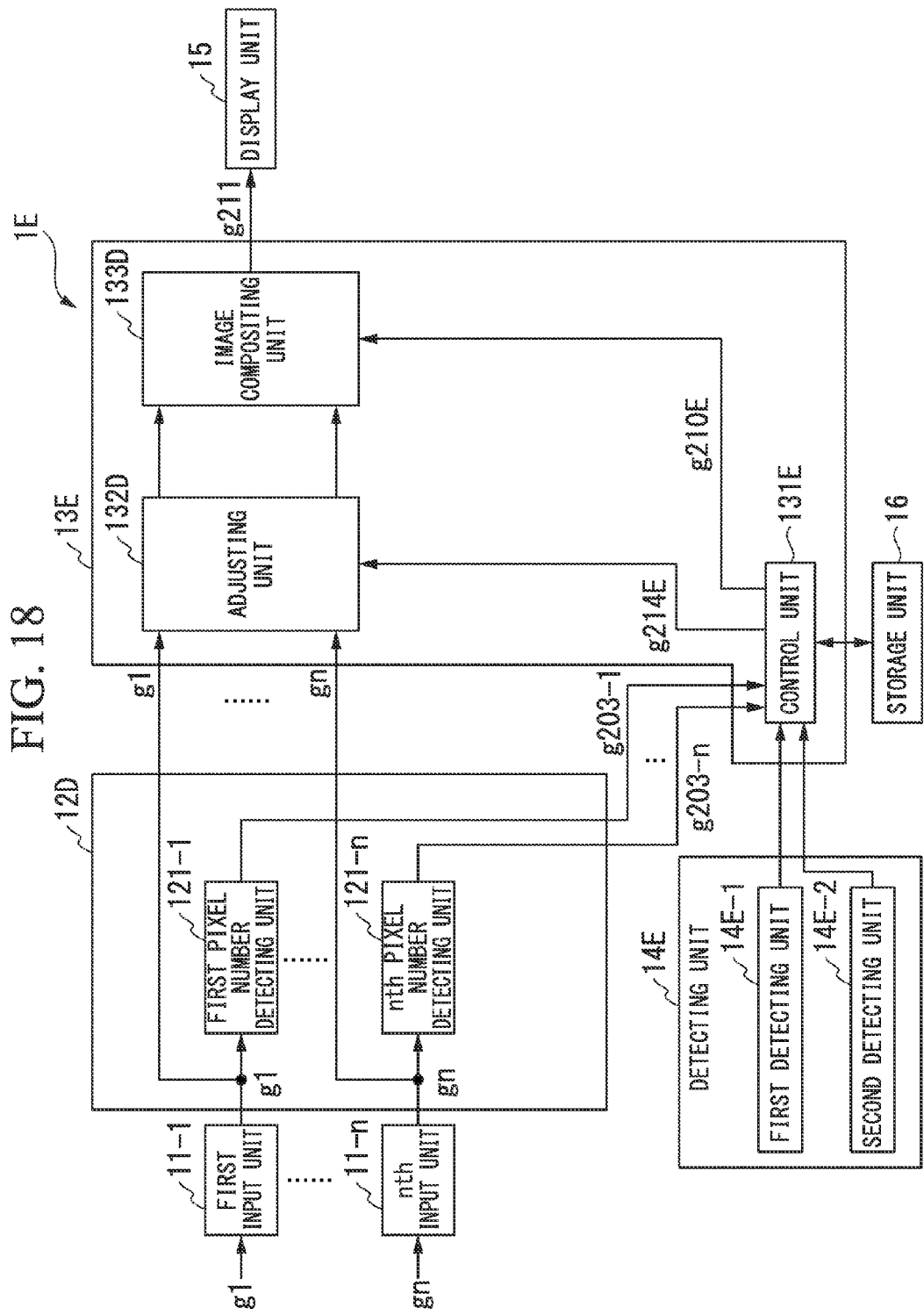
FIG. 18 is a block diagram of the schematic constitution of a display device according to a sixth exemplary embodiment.

FIG. 18 is a block diagram of a schematic configuration of the display device 1E according to the present exemplary embodiment. As shown in FIG. 18, the display device 1E includes the first input unit 11-1, the nth input unit 11-n, the selecting unit 12D, a processing unit 13E, a detecting unit 14E, the display unit 15, and the storage unit 16. Also, the detecting unit 14E includes a first detecting unit 14E-1 and a second detecting unit 14E-2. Note that function units having the same function as those of the display device 1D shown in the fifth exemplary embodiment shall use the same reference symbols, with descriptions thereof being omitted. Note that, similarly to the firth exemplary embodiment, the processing unit 13E may include the first pixel number detecting unit 121-1 and an nth pixel number detecting unit 121-n.

The first detecting unit 14E-1 detects priority information showing the user's selection of a desired input unit or designation of a preferred input unit via OSD display or the like by operation of a button switch or remote control of the display device body. The first detecting unit 14E-1 outputs the detected priority information to the control unit 131E of the processing unit 13E.

The second detecting unit 14E-2 detects each minimum resolution that the user desires when displaying in the display unit 15 each image contained in the video signal of each input unit via OSD display or the like by operation of a button switch or remote control of the display device body. Note that minimum resolution is the resolution at which, for example, when text is contained in the image that is contained in the video signal, this text can be deciphered. The second detecting unit 14E-2 outputs to the control unit 131E the user's selection of a desired input unit or designation of a preferred input unit that it has detected as well as information showing each minimum resolution that the user desires.

Video information g203-1, . . . , g203-n from the selecting unit 12D, priority information from the first detecting unit 14E-1, and information from the second detecting unit 14E-2 that shows each minimum resolution that the user desires are input to the control unit 131E. The control unit 131E reads out the resolution of the display unit 15 that is stored in the storage unit 16. Note that the control unit 131E, based on the video signal displayed in the display unit 15, may detect the resolution of the display unit 15.

The control unit 131E determines based on the resolution of the display unit 15 that has been read out, the video information g203-1, . . . , g203-n input from the selecting unit 12D, and the priority information and information showing each minimum resolution input from the detecting unit 14E whether or not, without changing the resolutions of the images contained in the first to nth video signals g1 to gn, it is possible to display the images side by side without overlapping in the display unit 15.

The control unit 131E, in the case of having determined that, without changing the resolutions of the images contained in the first to nth video signals g1 to gn, it is possible to display the images side by side without overlapping in the display unit 15, generates resolution information g214E that indicates not changing the resolutions of the images contained in the first to nth video signals, and outputs the generated resolution information g214E to the adjusting unit 132D. Also, the control unit 131E decides on the arrangement for displaying the images contained in the first to nth video signals g1 to gn side by side on the display unit 15 without overlapping each other, and outputs the decided arrangement information g210E to the image compositing unit 133D.

The control unit 131E, in the case of having determined that, without changing the resolutions of the images contained in the first to nth video signals g1 to gn, it is not possible to display the images side by side without overlapping in the display unit 15, compares the resolution of the image with the highest priority level, among the images contained in the first to nth video signals g1 to gn, and the resolution of the display unit 15, and determines whether or not the image with the highest priority level can be displayed within the resolution of the display unit 15 without reduction.

The control unit 131E, in the case of having determined that the image with the highest priority order can be displayed within the resolution of the display unit 15 without reduction, generates the resolution information g214E indicating the resolutions for changing the images of the second priority and lower to resolutions of the minimum resolution or greater of the corresponding images, without changing the resolution of the image with the highest priority order, and outputs this generated resolution information g214E to the adjusting unit 132D.

The control unit 131E, in the case of having determined that the image with the highest preference order cannot be displayed within the resolution of the display unit 15 without reduction, generates the resolution information g214E indicating the resolutions for changing the resolution of the image of the highest resolution to a resolution of the corresponding minimum resolution or greater, and for changing the images of the second priority and lower to resolutions of the corresponding minimum resolution or greater. The control unit 131E outputs the generated resolution information g214E to the adjusting unit 132E. Note that the computation method of image resolution shall be described below. Also, the control unit 131E decides on the arrangement for displaying on the display unit 15 the images contained in the first to nth video signals g1 to gn side by side without overlapping each other, and outputs the decided arrangement information g210E to the image compositing unit 133D.

Figure 19:
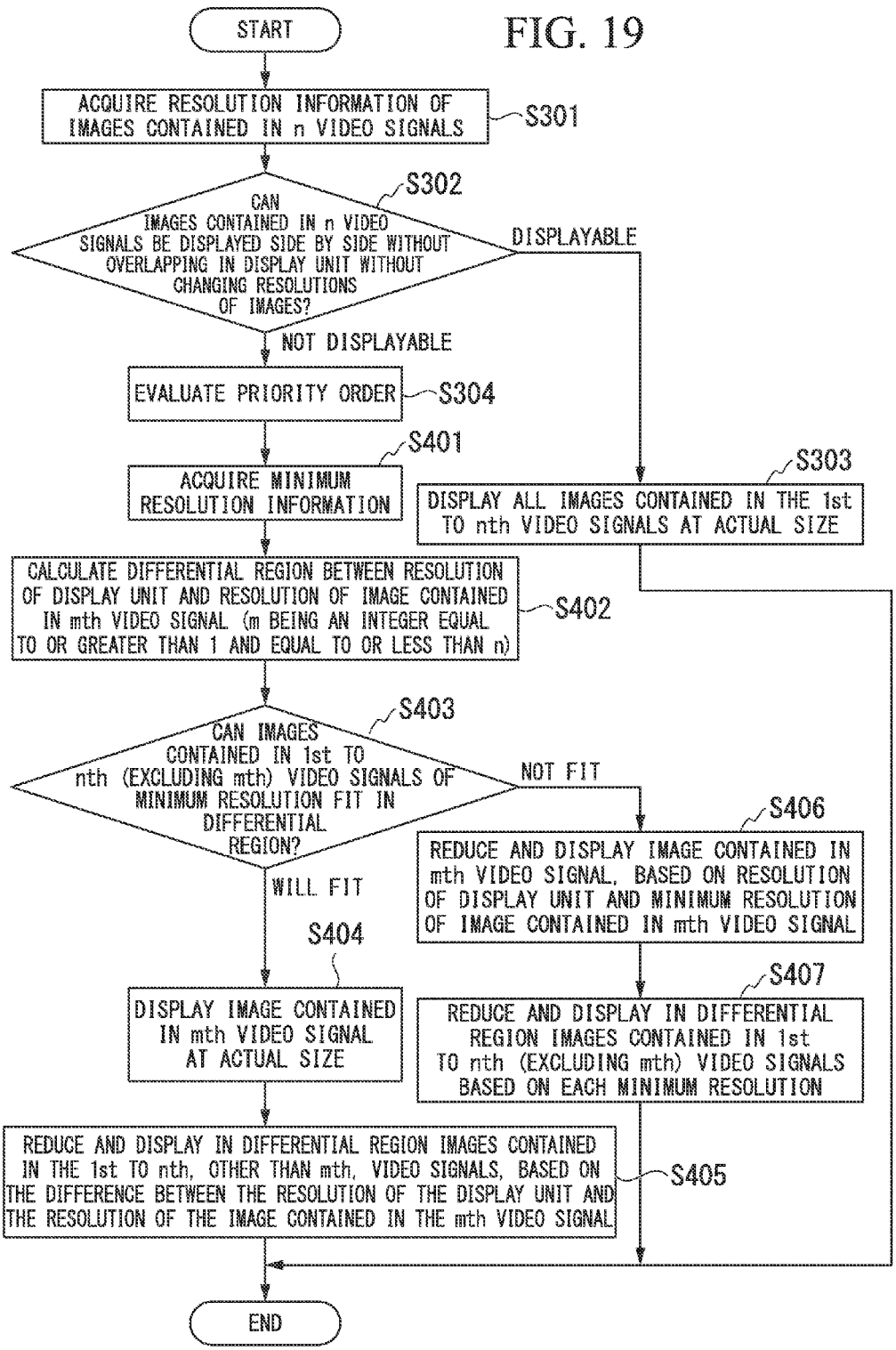
FIG. 19 is a flowchart of the process in image display according to the sixth exemplary embodiment.

Next, an example of the processing in the image display that the display device 1E performs shall be described with reference to FIG. 16 and FIG. 19. FIG. 19 is a flowchart of the processing the image display according to the present exemplary embodiment.

(Steps S301 to S304) Steps S301 to S304 are performed similarly to FIG. 15. When Step S304 is completed, the control unit 131E advances the processing to Step S401.

(Step S401) The control unit 131E acquires the minimum resolution of each image that is contained in the n video signals. After Step S401 ends, the control unit 131E advances the processing to Step S402.

(Step S402) The control unit 131E computes the resolution of the differential region of the output resolution X0×Y0 of the display unit 15 and the resolution Xm×Ym of the image contained in the mth video signal for which the highest priority has been detected. After Step S402 ends, the control unit 131E advances the processing to Step S403.

(Step S403) The control unit 131E judges whether or not it is possible to display (fit) side by side without overlapping the images contained in the first to nth (excluding mth) video signals of the minimum resolution acquired in Step S401, in the differential region on the display unit 15. The control unit 131E, in the case of having determined that the images contained in the first to nth (excluding m) video signals of the minimum resolution can be displayed in the differential region (Step S402: Will fit), advances the processing to Step S414. On the other hand, the control unit 131E, in the case of having determined that the images contained in the first to nth (excluding m) video signals of the minimum resolution will not fit in the differential region (Step S403: Will not fit), advances the processing to Step S406.

(Step S404) The control unit 131E performs control so as to display at actual size the image contained in the mth video signal for which the highest priority has been detected. After Step S404 ends, the control unit 131E advances the processing to Step S405.

(Step S405) The control unit 131E, based on the resolution of the differential region calculated in Step S402, performs control so as to reduce and display in the differential region the images of the first to nth video signals excluding the mth in accordance with the priority order detected in Step S304 and the minimum resolution information acquired in Step S401.

For example, the control unit 131E performs control so as to reduce at a ratio that results in at least the minimum resolution obtained in Step S401 the image contained in the video signal with the second priority order, and display the reduced image on the display unit 15. Moreover, the control unit 131E performs control so as to reduce at a ratio that results in at least the minimum resolution obtained in Step S401 the image contained in the video signal with the third priority level, and display the reduced image on the display unit 15. Hereinbelow, when the control unit 131E has performed control so as to repeat Step S405 in accordance with the number of video signals that have been input, and display the images contained in all of the video signals on the display unit 15, it ends the processing.

(Step S406) The control unit 131E, based on the minimum resolution of the mth video signal with the highest priority obtained in Step S401, performs control so as to reduce and display the image contained in the mth video signal in a manner that fits on the display unit 15. Note that the reduction factor of the image contained in the mth video signal is equal to or greater than the minimum resolution obtained in Step S401. For this reason, the control unit 131E determines whether or not the image contained in the mth video signal for which the highest priority has been detected can be displayed in the differential region, and in the case of determining that display is not possible, may be made to perform a report to the effect that the images contained in all the video signals cannot be displayed at the minimum resolution. After Step S406 is completed, the control unit 131E advances the processing to Step S407.

(Step S407) The control unit 131E, based on the resolution of the differential calculated in Step S402, performs control so as to reduce and display in the differential region the images of the first to nth video signals other than the mth, in accordance with the priority order detected in Step S304 and the minimum resolution information acquired in Step S401. Note that in Step S407, the control unit 131E performs control so as to control the arrangement and perform display of each of the images contained in the video signals of the second priority level and lower on the display 15 at the minimum resolution. However, in accordance with the size of the differential region, in the case of display by a reduction rate of more than the minimum resolution being possible, the control unit 131E may perform control so as to control the arrangement and perform display of each of the images contained in the video signals of the second priority level and lower at more than the minimum resolution.

Hereinabove, the processing for displaying side by side without overlapping the images contained in the plurality of video signals ends.

Figure 20:
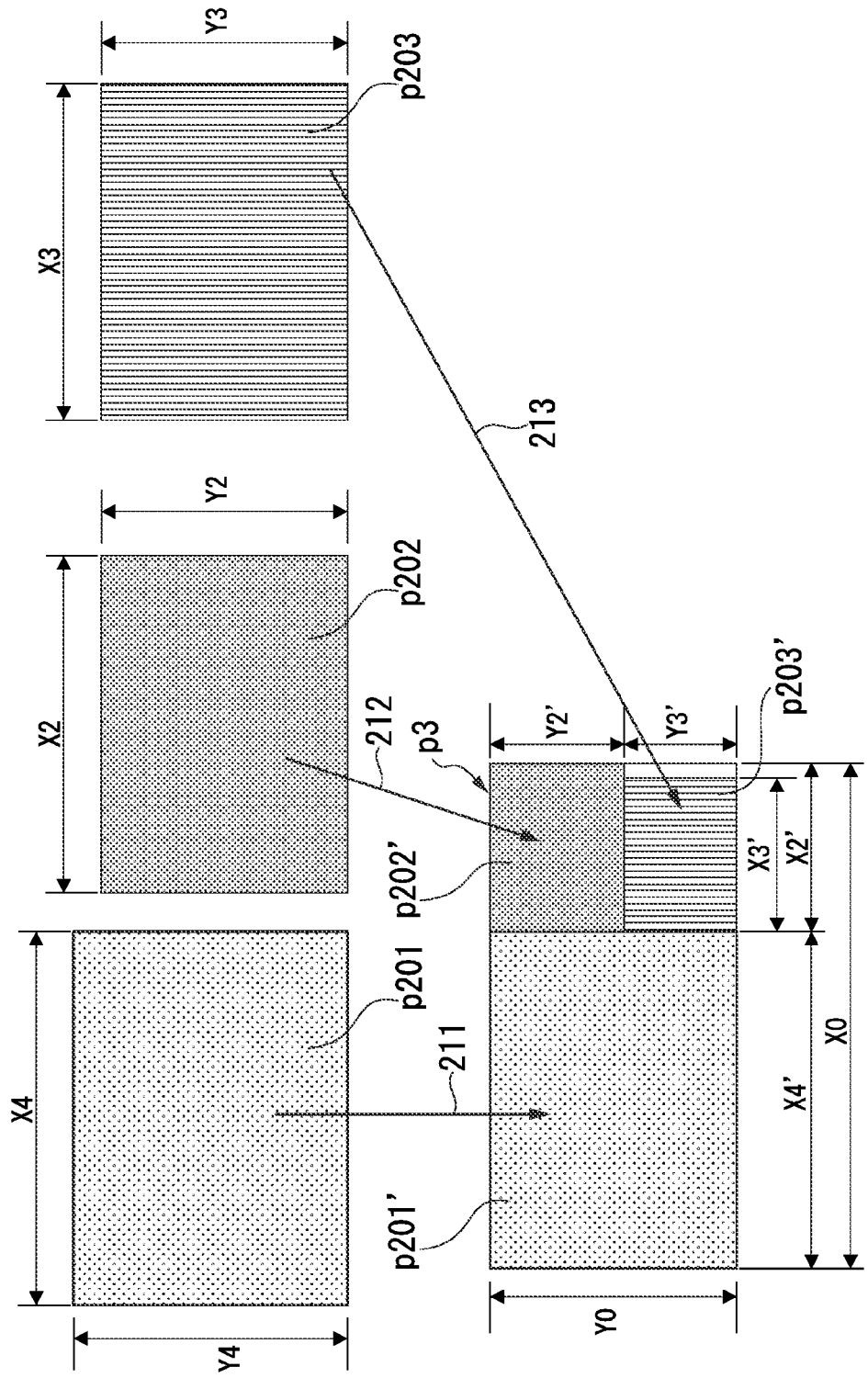
FIG. 20 is a diagram that explains an example of input images and display images according to the sixth exemplary embodiment.
Figure 21:
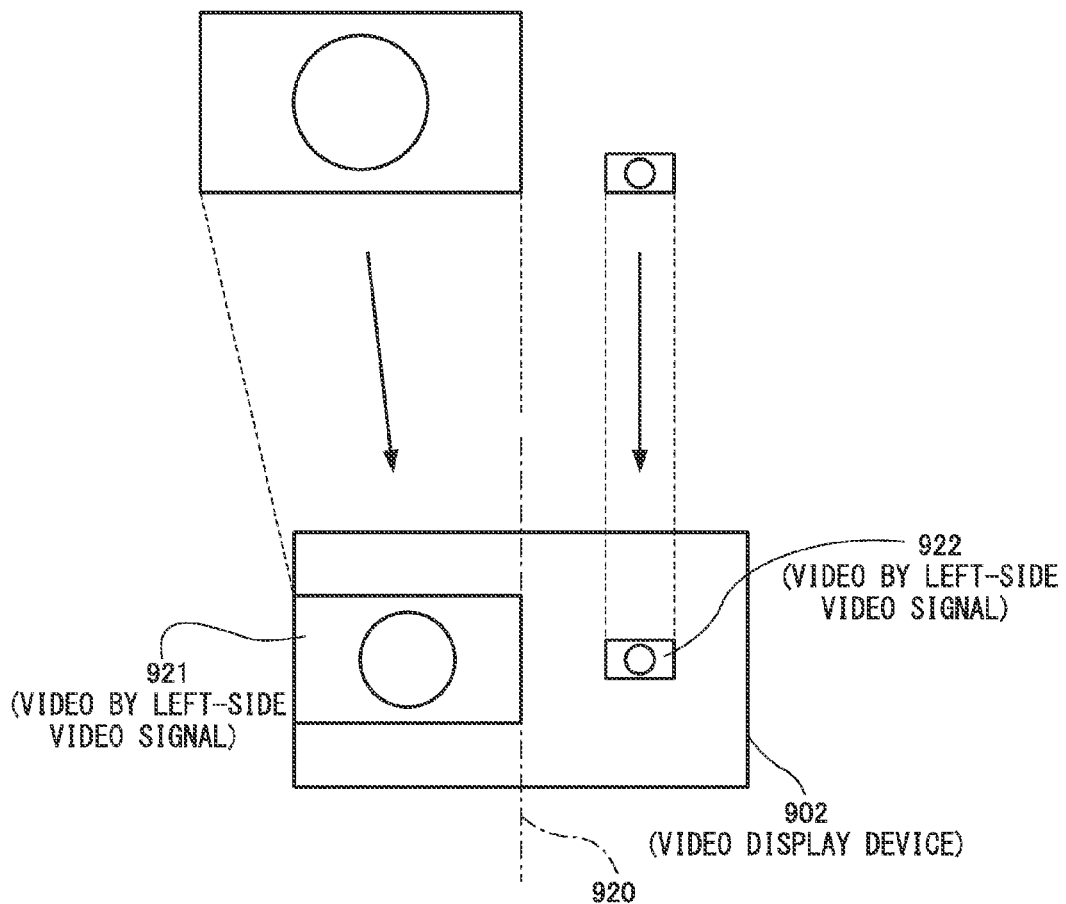
FIG. 21 is a diagram that explains a display example of a mode that displays videos of two channels side by side on one screen.

Next, an example of the processing shown in FIG. 19 that the control unit 131E performs shall be described with reference to FIG. 20. FIG. 20 is a diagram for describing an example of the input images and display images according to the present exemplary embodiment. In the example shown in FIG. 20, the example shall be described of three video signals being input to the display device 1E. Here, the resolution of the display unit is X0×Y0, and the resolution of the image p201 contained in the first video signal is X4×Y4. Also, the resolution of the image p202 contained in the second video signal is X2×Y2, while the resolution of the image p203 contained in the third video signal is X3×Y3. Also, the resolution Y4 in the vertical direction of the image p201 is greater than the resolution Y0 in the vertical direction of the display unit 15, and the resolution X4 in the horizontal direction of the image p201 is less than the resolution X0 in the vertical direction of the display unit 15. In addition, the highest priority order is set to the first video signal g1, the second priority order is set to the second video signal g2, and the third priority order is set to the third video signal g3.

In Step S302, the control unit 131E computes the sum ΣX of the resolutions in the horizontal direction of the images p201 to p203 (=X4+X2+X3), and the sum ΣY of the resolutions in the vertical direction of the images p201 to p203 (=Y4+Y2+Y3). Next, the control unit 131E judges that the sum ΣX of the resolutions in the horizontal direction exceeds the resolution X0 in the horizontal direction of the display unit 15, and moreover that the sum ΣY of the resolutions in the vertical direction exceeds the resolution Y0 in the vertical direction of the display unit 15.

The control unit 131E computes the resolution of the differential region of X0×Y0 of the output resolution of the display unit 15 and X4×Y4 of the resolution of the image contained in the first image signal g1 in which the highest priority order is detected (Step S402). In this case, since the resolution Y4 in the vertical direction of the image that is contained in the first video signal g1 is greater than the resolution Y0 in the vertical direction of the display unit 15, the control unit 131E, based on the minimum resolution of the first video signal g1 with the highest priority, performs control so as to reduce the image that is contained in the first video signal g1 so as to fit in the display unit 15, and display the reduced image p201'. Thereafter, the control unit 131E performs control so as to display in the differential region the image p202 as the image p202' reduced to a resolution of the minimum resolution or greater. Moreover, the control unit 131E performs control so as to display in the differential region the image p203 as the image p203' reduced to a resolution of the minimum resolution or greater (Step S407).

In the above manner, in the display device 1E of the present exemplary embodiment, in the case of the resolutions of the images contained in the first to nth video signals being greater than the display region of the display unit 15, even the highest priority video image is reduced to a resolution of the minimum resolution or greater and displayed on the display unit 15. Then in the display device 1E of the present exemplary embodiment, the images that are contained in the remaining video signals, based on the priority order and minimum resolution corresponding to each image, are in turn displayed side by side so as not to overlap in the remaining differential region after displaying the image contained in the highest priority video signal. Thereby, according to the display device 1E of the present exemplary embodiment, since it is possible to display side by side so as not to overlap the resolutions of the images contained in the plurality of video signals that have been input, at for example a resolution of the minimum resolution or greater that the user has set, when displaying a plurality of videos on one screen, it is possible to ensure the ease of viewing of the videos.

Note that in the present exemplary embodiment, the example has been described of the user deciding the minimum resolution by operating the second detecting unit 14E-2, but it is not limited thereto. Image output devices (not illustrated) that each output a video signal may decide the minimum resolution of an image contained in each video signal, and output it included in each video signal.

Also, in the present exemplary embodiment, as an example of the shape of the display region of the display unit 15, examples of a vertically long rectangle and a horizontally long rectangle have been described, but it is not limited thereto. For example, the shape of the display region of the display unit 15 may be approximately square, approximately circular, approximately oval, polygonal, and the like.

Note that control of the operations may be performed by recording on a computer-readable recording medium a program for realizing all or some of the functions of the control unit (CPU) 17 and the processing unit (video processing circuit) 13 in FIG. 1, the selecting unit 12A and the processing unit 13A in FIG. 5, the selecting unit 12B and the processing unit 13B in FIG. 7, the selecting unit 12C and the processing unit 13C in FIG. 10, the selecting unit 12D and the processing unit 13D in FIG. 14 and the selecting unit 12D and the processing unit 13E in FIG. 18, reading the program that is recorded on this recording medium into a computer system, and running it. Note that "computer system" here includes an operating system and hardware such as peripheral devices.

Also, the "computer system" in the case of using a WWW system also includes a homepage providing environment (or display environment).

Furthermore, the "computer-readable recording medium" refers to a storage device such as a portable medium including a flexible disk, magneto optical disk, ROM, CD-ROM, and also a hard disk or the like incorporated in a computer system. Furthermore, the "computer-readable recording medium" includes those that retain a program for a given period of time such as a volatile memory in a computer system functioning as a server or client. Also, the aforementioned program may be one for realizing some of the abovementioned functions, and moreover may be one capable of realizing the abovementioned functions in combination with a program that has already been stored in the computer system. Also, the aforementioned program may be stored in a predetermined server, and in accordance with a request from another device, the program may be distributed (downloaded and the like) via communication lines.

Hereinabove, exemplary embodiments of this invention have been described in detail referring to the drawings, but specific constitutions are not limited to these specific exemplary embodiments, and designs within a range that does not depart from the scope of this invention are also included.

Note that aspects of the present invention, in summary, can be expressed in the manner of the following supplementary note 1 to supplementary note 18.

[Supplementary Note 1]

A display device including:

a display unit that simultaneously displays a plurality of videos;

a priority order setting unit that sets a priority order for the plurality of videos; and a processing unit that causes the display unit to display the plurality of videos, wherein the processing unit determines whether or not the plurality of videos can be displayed side by side without overlapping each other in the display unit without changing resolutions of the plurality of videos, when, as a result of the determination, the processing unit determines that the plurality of videos can be displayed side by side without overlapping each other in the display unit without changing the resolutions of the plurality of videos, the processing unit causes the display unit to display the plurality of videos side by side without overlapping each other without changing the resolutions of the plurality of videos, and when, as the result of the determination, the processing unit determines that the plurality of videos cannot be displayed side by side without overlapping each other in the display unit without changing the resolutions of the plurality of videos, the processing unit changes a resolution of at least one of the plurality of videos based on a resolution of the display unit, the resolutions of the plurality of videos, and the priority order, and causes the display unit to display the plurality of videos including the video for which the resolution has been changed side by side without overlapping each other.

[Supplementary Note 2]

The display device according to supplementary note 1, wherein, when, as the result of the determination, the processing unit determines that the plurality of videos cannot be displayed side by side without overlapping each other in the display unit without changing the resolutions of the plurality of videos, the processing unit, without changing a resolution of a video having a highest priority order among the plurality of videos, changes a resolution of at least one video among the videos other than the video having the highest priority order based on the resolution of the display unit, the resolutions of the plurality of videos, and the priority order, and causes the display unit to display the plurality of videos including the video for which the resolution has been changed side by side without overlapping each other.

[Supplementary Note 3]

The display device according to supplementary note 1 or supplementary note 2, further including:

a minimum resolution setting unit that sets a minimum resolution of the videos displayed in the display unit, wherein when, as the result of the determination, the processing unit determines that the plurality of videos cannot be displayed side by side without overlapping each other in the display unit without changing the resolutions of the plurality of videos, the processing unit changes a resolution of at least one of the plurality of videos based further on the minimum resolution, and causes the display unit to display the plurality of videos including the video for which the resolution has been changed side by side without overlapping each other.

[Supplementary Note 4]

The display device according to supplementary note 3, wherein when, as the result of the determination, the processing unit determines that the plurality of videos cannot be displayed side by side without overlapping each other in the display unit without changing the resolutions of the plurality of videos, and that if a resolution of at least one of the plurality of videos is not made smaller than the minimum resolution, the plurality of videos cannot be displayed side by side without overlapping each other in the display unit without changing a resolution of a video having a highest priority order among the plurality of videos, the processing unit changes the resolution of the video having the highest priority order and causes the display unit to the display unit it.

[Supplementary Note 5]

The display device according to any one of supplementary note 1 to supplementary note 4, wherein at least two videos among the plurality of videos is arranged in the display unit in a predetermined direction without overlapping.

[Supplementary Note 6]

The display device according to supplementary note 5, wherein the predetermined direction is a horizontal direction.

[Supplementary Note 7]

The display device according to supplementary note 5, wherein the predetermined direction is a vertical direction.

[Supplementary Note 8]

The display device according to any one of supplementary note 1 to supplementary note 7, wherein the processing unit, based on a resolution of the video having a highest priority order and the resolution of the display unit, calculates a resolution of a video other than the video having the highest priority order, changes the resolution of the video other than the video having the highest priority order in accordance with the calculated resolution, and display the changed video in the remaining region.

[Supplementary Note 9]

The display device according to any one of supplementary note 1 to supplementary note 8, wherein when, as the result of the determination, the processing unit determines that the plurality of videos cannot be displayed side by side without overlapping each other in the display unit without changing the resolutions of the plurality of videos, the processing unit changes the resolutions of the videos without changing an aspect ratio.

[Supplementary Note 10]

The display device according to any one of supplementary note 1 to supplementary note 9, wherein when, as the result of the determination, the processing unit determines that the plurality of videos cannot be displayed side by side without overlapping each other in the display unit without changing the resolutions of the plurality of videos, the processing unit detects an effective area of a video other than the video having the highest priority among the plurality of videos, extracts the effective area that has been detected from the video other than the video having the highest priority, and displays side by side without overlapping the video of the effective area that has been obtained by extraction in the remaining region after displaying the video having the highest priority.

[Supplementary Note 11]

The display device according to supplementary note 10, wherein the processing unit detects as the effective area an area of a range in which the signal level of the video is set beforehand.

[Supplementary Note 12]

The display device according to supplementary note 10 or supplementary note 11, wherein the processing unit detects the effective area by detecting a start point and an end point of the effective area in the vertical direction of the video other than the video having the highest priority order among the plurality of videos, and detecting a start point and an end point of the effective area in the horizontal direction of the video other than the video with the highest priority order among the plurality of videos.

[Supplementary Note 13]

The display device according to any one of supplementary note 10 to supplementary note 12, including:

a pixel number detecting unit that detects pixel numbers of the plurality of videos; and the processing unit, based on the pixel numbers that the pixel number detecting unit has detected, determines whether or not the video other than the video having the highest priority order can be displayed in the remaining region, and when the processing unit determines that the video other than the video having the highest priority order cannot be displayed in the remaining region, extracts the detected effective area from the video other than the video having the highest priority order.

[Supplementary Note 14]

The display device according to any one of supplementary note 1 to supplementary note 13, wherein the priority order setting unit selects the plurality of input units selected by a user among the plurality of input units, sets one input unit among the plurality of input units that have been selected as a priority input unit by a designation of the user, and setting a highest priority order for a video input to the priority input unit.

[Supplementary Note 15]

A display method including:

a display step of simultaneously displaying a plurality of videos in a display unit;

a priority order setting step of setting a priority order for the plurality of videos;

a step of determining whether or not the plurality of videos can be displayed side by side without overlapping each other in the display unit without changing the resolutions of the plurality of videos;

a step of, when, as a result of the determination, it is determined that the plurality of videos can be displayed side by side without overlapping each other in the display unit without changing the resolutions of the plurality of videos, causing the display unit to display the plurality of videos side by side without overlapping each other without changing the resolutions of the plurality of videos; and a step of, when, as the result of the determination, it is determined that the plurality of videos cannot be displayed side by side without overlapping each other in the display unit without changing the resolutions of the plurality of videos, changing a resolution of at least one of the plurality of videos based on a resolution of the display unit, the resolutions of the plurality of videos, and the priority order, and causing the display unit to display the plurality of videos including the video for which the resolution has been changed side by side without overlapping each other.

[Supplementary Note 16]

The display method according to supplementary note 15, including:

a step of, as the result of the determination, it is determined that the plurality of videos cannot be displayed side by side without overlapping each other in the display unit without changing the resolutions of the plurality of videos, without changing a resolution of a video having a highest priority order among the plurality of videos, changing a resolution of at least one video among the videos other than the video having the highest priority order based on a resolution of the display unit, the resolutions of the plurality of videos, and the priority order; and a step of causing the display unit to display side by side without overlapping each other the plurality of videos including the video for which the resolution has been changed.

[Supplementary Note 17]

A display method including:

a step of displaying on a display unit a video having a highest priority order input to one input unit designated based on a detection value without changing its resolution;

a step of changes a resolution of a video other than the video having the highest priority order input to another input unit; and a processing step of displaying the changed video other than the video having the highest priority order in the remaining region after displaying the video having the highest priority order on the display unit.

[Supplementary Note 18]

A display method including:

a selecting step of selecting at least one input unit among a plurality of input units to which video signals are respectively input;

a step of setting one input unit among the input units selected by the selecting step as a priority input unit;

a step of displaying on a display unit a video having a highest priority order input to the priority input unit without changing its resolution;

a step of changing a resolution of a video other than the video having the highest priority order input to an input unit that has been selected by the selecting step and that differs from the priority input unit; and a processing step of displaying the changed video other than the video having the highest priority in the remaining region after displaying the video having the highest priority order on the display unit.

Also, this application is based upon and claims the benefit of priority from PCT/JP2012/068074 filed Jul. 17, 2012, and PCT/JP2012/083995 filed Dec. 27, 2012, the disclosures of which are incorporated herein in their entirety by reference.

REFERENCE SYMBOLS 1, 1A, 1B, 1C, 1D, 1E Display device
13 Processing unit (video processing circuit)
14, 14D, 14E Detecting unit (adjustment switch)
15 Display unit (liquid crystal panel)
16 Storage unit (storage memory)
17 Control unit (CPU)
g1 Video signal (1)
g2 video signal (2)
11-1 to 11$n$ First input unit to nth input unit (n being an integer of 2 or more)
12A, 12B, 13C, 13D, 13E Selecting unit
13A, 13B, 13C, 13D Processing unit
121 First pixel number detecting unit
122 Second pixel number detecting unit 123, 123C Switching unit
131, 131C, 131D, 131E Control unit
132, 132D, 133D Adjusting unit
133 Image compositing unit
134 Image start point detecting unit
14E-1 First detecting unit
14E-2 Second detecting unit
g1 to gn First video signal to nth video signal

The invention claimed is:
1. A display device comprising:
a display unit that simultaneously displays a plurality of videos;
a priority order setting unit that sets a priority order for the plurality of videos; and
a processing unit that causes the display unit to display the plurality of videos,
wherein the processing unit determines whether or not the plurality of videos can be displayed side by side without overlapping each other in the display unit without changing resolutions of the plurality of videos,
when, as a result of the determination, the processing unit determines that the plurality of videos can be displayed side by side without overlapping each other in the display unit without changing the resolutions of the plurality of videos, the processing unit causes the display unit to display the plurality of videos side by side without overlapping each other without changing the resolutions of the plurality of videos,
when, as the result of the determination, the processing unit determines that the plurality of videos cannot be displayed side by side without overlapping each other in the display unit without changing the resolutions of the plurality of videos, the processing unit changes a resolution of at least one of the plurality of videos based on a resolution of the display unit, the resolutions of the plurality of videos, and the priority order, and causes the display unit to display the plurality of videos including the video for which the resolution has been changed side by side without overlapping each other,
when, as the result of the determination, the processing unit determines that the plurality of videos cannot be displayed side by side without overlapping each other in the display unit without changing the resolutions of the plurality of videos, the processing unit, without changing a resolution of a video having a highest priority order among the plurality of videos, changes a resolution of at least one video among the videos other than the video having the highest priority order based on the resolution of the display unit, the resolutions of the plurality of videos, and the priority order, and causes the display unit to display the plurality of videos including the video for which the resolution has been changed side by side without overlapping each other.

2. The display device according to claim 1, further comprising:
a minimum resolution setting unit that sets a minimum resolution of at least one of the videos displayed in the display unit,
wherein when, as the result of the determination, the processing unit determines that the plurality of videos cannot be displayed side by side without overlapping each other in the display unit without changing the resolutions of the plurality of videos, the processing unit changes a resolution of at least one of the plurality of videos based further on the minimum resolution, and causes the display unit to display the plurality of videos including the video for which the resolution has been changed side by side without overlapping each other.

3. The display device according to claim 2, wherein when, as the result of the determination, the processing unit determines that the plurality of videos cannot be displayed side by side without overlapping each other in the display unit without changing the resolutions of the plurality of videos, and that if a resolution of at least one of the plurality of videos is not made smaller than a minimum resolution thereof, the plurality of videos cannot be displayed side by side without overlapping each other in the display unit without changing a resolution of a video having a highest priority order among the plurality of videos, the processing unit changes the resolution of the video having the highest priority order and causes the display unit to display the plurality of videos including the video having the highest priority order for which the resolution has been changed.

4. The display device according to claim 1, wherein at least two videos among the plurality of videos is arranged in the display unit in a predetermined direction without overlapping.

5. The display device according to claim 4, wherein the predetermined direction is a horizontal direction.

6. The display device according to claim 4, wherein the predetermined direction is a vertical direction.

7. The display device according to claim 1, wherein
the processing unit, based on a resolution of a video having a highest priority order among the plurality of videos and the resolution of the display unit, calculates a resolution of a video other than the video having the highest priority order, changes the resolution of the video other than the video having the highest priority order in accordance with the calculated resolution, and display the changed video in a region of the display unit other than a region where the video having the highest priority order is displayed.

8. The display device according to claim 1, wherein when, as the result of the determination, the processing unit determines that the plurality of videos cannot be displayed side by side without overlapping each other in the display unit without changing the resolutions of the plurality of videos, the processing unit changes a resolution of at least one of the videos without changing an aspect ratio of the at least one of the videos.

9. A display method comprising:
simultaneously displaying a plurality of videos in a display unit;
setting a priority order for the plurality of videos;
determining, via a processor, whether or not the plurality of videos can be displayed side by side without overlapping each other in the display unit without changing the resolutions of the plurality of videos;
when, as a result of the determining by the processor, it is determined that the plurality of videos can be displayed side by side without overlapping each other in the display unit without changing the resolutions of the plurality of videos, causing the display unit to display the plurality of videos side by side without overlapping each other without changing the resolutions of the plurality of videos;
when, as the result of the determining by the processor, it is determined that the plurality of videos cannot be displayed side by side without overlapping each other in the display unit without changing the resolutions of the plurality of videos, changing a resolution of at least one of the plurality of videos based on a resolution of the display unit, the resolutions of the plurality of videos, and the priority order, and causing the display unit to display the plurality of videos including the video for which the resolution has been changed side by side without overlapping each other; and when, as the result of the determining, it is determined that the plurality of videos cannot be displayed side by side without overlapping each other in the display unit without changing the resolutions of the plurality of videos, a resolution of at least one video among the videos other than a video having a highest priority order among the plurality of videos is changed based on the resolution of the display unit, the resolutions of the plurality of videos, and the priority order, without a resolution of the video having the highest priority order being changed, and the display unit is caused to display the plurality of videos including the video for which the resolution has been changed side by side without overlapping each other.

10. The display method according to claim 9, wherein when, as the result of the determining, it is determined that the plurality of videos cannot be displayed side by side without overlapping each other in the display unit without changing the resolutions of the plurality of videos, a resolution of at least one of the videos is changed without changing an aspect ratio of the at least one of the videos.

11. The display device according to claim 1, wherein the processing unit, without changing a resolution of a video having a highest priority order among the plurality of videos, changes a resolution of at least one video among the videos other than the video having the highest priority order based on the resolution of the display unit, the resolutions of the plurality of videos, and the priority order, and causes the display unit to display the plurality of videos including the video for which the resolution has been changed side by side without overlapping each other.

12. The display device according to claim 1, wherein the processing unit changes a resolution of at least one video among the videos other than the video having a highest priority order based on a resolution of the display unit, the resolutions of the plurality of videos, and the priority order, and causes the display unit to display the plurality of videos including the video for which the resolution has been changed side by side without overlapping each other.

13. The display device according to claim 1, wherein the processing unit changes a resolution of at least one of the videos without changing an aspect ratio of the at least one of the videos.

14. The display device according to claim 1, wherein the display unit displays the plurality of videos side by side such that a first video of the plurality of videos is displayed on a left side or a right side of a second video of the plurality of videos.

15. The display device according to claim 1, wherein the display unit displays the plurality of videos side by side such that a first video of the plurality of videos is displayed on a top side or a bottom side of a second video of the plurality of videos.

16. The display device according to claim 1, wherein the display unit displays a video having a highest priority order among the plurality of videos at a predetermined position on the display unit at an actual size in the display unit.

17. The display device according to claim 1, wherein the display unit displays a video having a highest priority order among the plurality of videos without changing a resolution of the video having the highest priority order.

18. The display method according to claim 9, wherein the displaying displays a video having a highest priority order among the plurality of videos without changing a resolution of the video having the highest priority order on the display unit.

* * * * *